(12) United States Patent
Clawson et al.

(10) Patent No.: US 12,384,414 B1
(45) Date of Patent: Aug. 12, 2025

(54) SAFETY COMPONENT VALIDATION AND UPDATE MANAGEMENT

(71) Applicant: Zoox, Inc., Foster City, CA (US)

(72) Inventors: Taylor Scott Clawson, Hyde Park, UT (US); Shayan Darayan, Sugar Land, TX (US); Brian Michael Filarsky, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 195 days.

(21) Appl. No.: 17/937,291

(22) Filed: Sep. 30, 2022

(51) Int. Cl.
*B60W 60/00* (2020.01)
*B60W 50/02* (2012.01)
*B60W 50/06* (2006.01)
*B60W 50/10* (2012.01)
*G07C 5/02* (2006.01)

(52) U.S. Cl.
CPC .... *B60W 60/0015* (2020.02); *B60W 50/0205* (2013.01); *B60W 50/06* (2013.01); *B60W 50/10* (2013.01); *G07C 5/02* (2013.01)

(58) Field of Classification Search
CPC ......... B60W 60/0015; B60W 50/0205; B60W 50/06; B60W 50/10; G07C 5/02
See application file for complete search history.

(56) References Cited

U.S. PATENT DOCUMENTS

2019/0361432 A1\* 11/2019 Levinson ................. H04L 67/10
2021/0048817 A1\* 2/2021 Olson ..................... B60W 30/00
2022/0135075 A1\* 5/2022 Ng ........................... G06F 9/505
701/301

OTHER PUBLICATIONS

A Fleet Learning Architecture for Enhanced Behavior Predictions during Challenging External Conditions Florian Wirthmuller et al., IEEE Dec. 2020 (Year: 2020).\*

\* cited by examiner

*Primary Examiner* — Navid Z. Mehdizadeh
*Assistant Examiner* — Oliver Tan
(74) *Attorney, Agent, or Firm* — Lee & Hayes, P.C.

(57) ABSTRACT

Techniques for validating operation of vehicle safety system components are discussed herein. Vehicle log data processed by components of secondary systems of vehicles traversing an environment can be received which may include event metrics or be indicative of events (such as an implementation of a safety response). Such metrics may be defined by algorithm output continuity data, algorithm output feasibility data, and/or algorithm output tracking data. The log data can be utilized to test candidate safety systems to determine test event metrics. Validation of the candidate safety system components can be performed based on aggregated event metrics (such as aggregated over a fleet) meeting various criteria.

20 Claims, 7 Drawing Sheets

SAFETY COMPONENT VALIDATION AND UPDATE MANAGEMENT

BACKGROUND

Safety of passengers is a primary concern in vehicle navigation and control. Such safety is often predicated on accurate detections of potential collisions and timely deployments of safety measures. Another concern is passenger comfort, which is achieved through smooth and moderate transitions in vehicle motion as circumstances permit. Vehicle systems include primary systems to control vehicles and secondary systems to perform supplementary operations utilized to refine and optimize vehicle control, as well as to compensate for occasional and slight primary system inaccuracies. Any errors in these secondary systems may result in unsafe operating conditions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
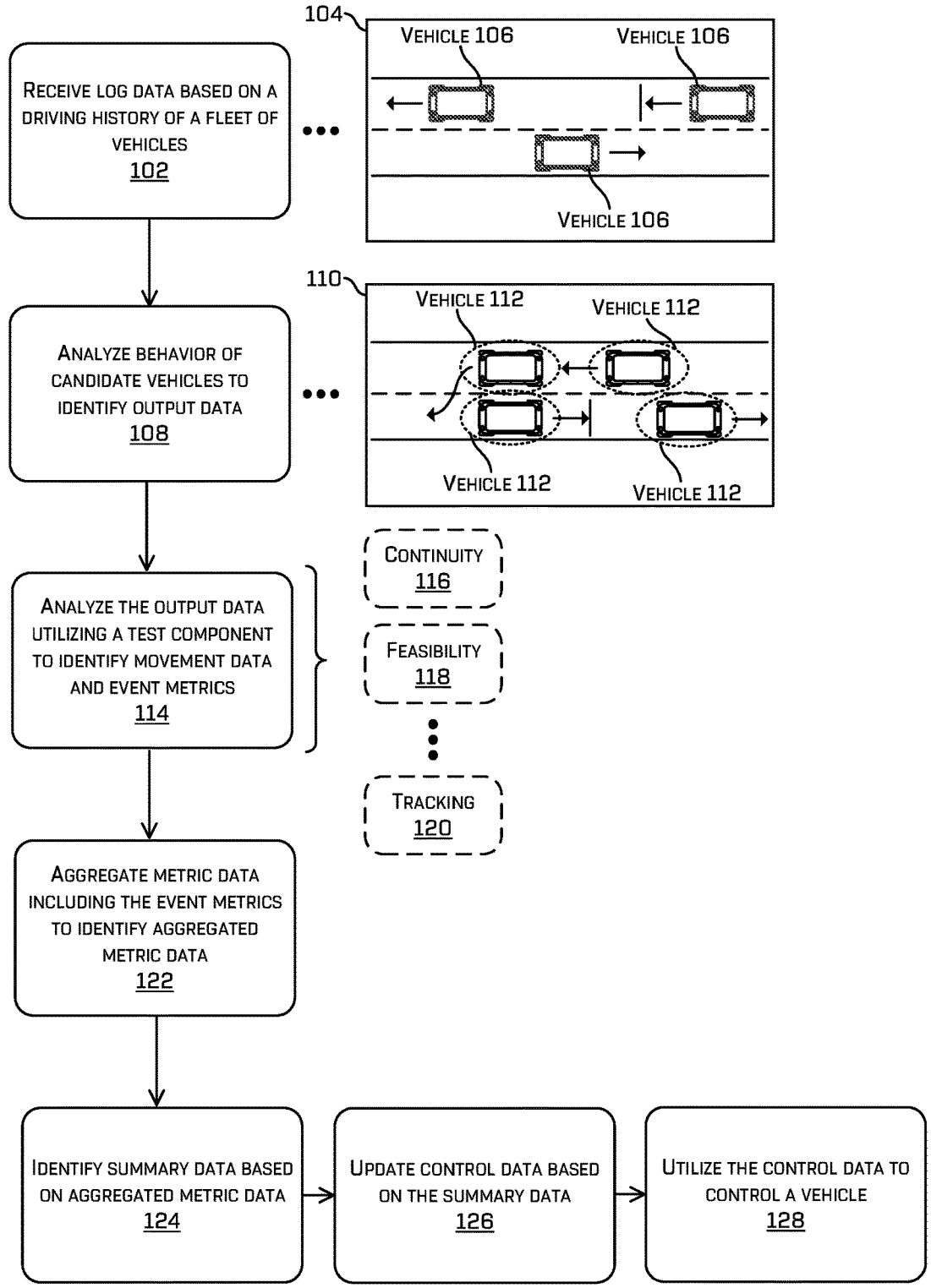
FIG. 1 is a pictorial flow diagram of an example process for safety component validation and update management.

Techniques for validating operation of vehicle safety system components are discussed herein. For example, a vehicle safety system component can receive a trajectory from a planning component of an autonomous vehicle. The vehicle safety system component ("safety component") can evaluate the trajectory to determine whether the trajectory conforms to safety metrics or is otherwise valid. If the trajectory is valid, the safety component passes the trajectory to a vehicle control system, but if the trajectory is invalid the safety component triggers an action such as taking over control of the vehicle to implement a safe stopping trajectory, or otherwise modifying the trajectory and/or determining a new trajectory. When a new version of the safety component is to be tested and validated, log data from vehicles can be input to a test safety component to determine reactions or events triggered by the test safety component and reasons why the test safety component triggered. Such event metrics can be aggregated without fully simulating an operation of the vehicle to determine an overall operation of the test safety component, which can validate an operation of the component. The validated component can be sent to vehicles of a fleet of autonomous vehicles to control operation of the vehicles as they traverse environments in a safe manner.

Such validation techniques help to ensure precision and accuracy of secondary vehicle safety system components. For instance, event metrics can be determined based on vehicle log data processed by components of the secondary systems. The log data, which can be collected from fleets of vehicles and/or generated in simulation, can be utilized to test the safety systems. Such log data may comprise, for example, sensor data, output of one or more systems, subsystems, components, etc. planner data, control data, state data, etc. The safety systems can be tested to determine the event metrics, including representative event metrics associated with representative vehicles and test event metrics associated with candidate vehicles. The representative event metrics can be identified as representations of actions (or "representative actions") determined by safety system components (or "representative vehicle safety system components"). The test event metrics can be identified as representations of other actions (or "test actions") determined by other safety system components (or "candidate safety system components"). The event metrics can be utilized as representations of vehicle actions identified by algorithm output data, which can include vehicle continuity data, vehicle feasibility data, and/or vehicle tracking data. Validation of the safety system components can be performed based on aggregated event metrics, which can include the representative event metrics, the test event metrics, or a combination of the representative event metrics and the test event metrics.

The log data can represent driving histories of fleet vehicles associated with vehicles types and vehicle locations. The log data to be utilized to test safety system components of vehicles can be identified based on similarities between representative vehicle types and test vehicle types being equal to or greater than threshold similarities, the representative vehicle types being associated with representative vehicles that include representative safety system components utilized to generate the log data, the test vehicle types being associated with candidate vehicles that include candidate safety system components to be tested.

Similarities between representative vehicle types (e.g., vehicle types of vehicles having previously traveled through the environments) and candidate vehicle types (e.g., vehicle types of vehicles to be tested) being equal to or greater than threshold similarities can be identified based on vehicle type data, including representative vehicle type data and test vehicle type data. The vehicle type data can include a make, a model, a size, a shape, one or more components (e.g., any of one or more portions of the vehicle, such as tires, seats, rims, brakes, etc.) a control system (e.g., hardware, software, etc. of the control system), and/or any of one or more other characteristics and/or information associated with the vehicle. Portions of the representative vehicle type data can be compared to respective portions of the test vehicle type data to identify the log data to be utilized for performing safety system component tests. The log data to be utilized for performing safety system component tests can be identified based on the portions of the representative vehicle type data matching or being relatively similar to respective portions of the test vehicle type data. By utilizing the log data associated with the representative vehicles that match, and/or are similar to, the candidate vehicles to be test by the log data, accuracy of comparisons between the representative safety system components and the test safety system components tests can be improved.

By identifying and/or adjusting threshold similarities, such as via operator input via a dashboard of a computing device, the amounts of similarities between the representative vehicles and the candidate vehicles utilized to determine the representative vehicles from which the log data is retrieved for testing the candidate vehicles may be increased. The threshold similarities may be increased (e.g., amounts of similarities between representative vehicle types and candidate vehicle types may be increased) to increase accuracies of comparisons between the representative event metrics and the test event metrics. Relatively higher accuracies of the comparisons between the representative event metrics and the test event metrics may produce more accurate and/or effective results from comparisons between the representative vehicle safety system components and the candidate vehicle safety system components. By way of example, relatively higher threshold similarities may result in the representative vehicle safety system components utilized to obtain the log data being relatively more similar to the candidate vehicle safety system components to be tested. The representative vehicle safety system components being relatively more similar to the candidate vehicle safety system components may be utilized to identify, more accurately and/or effectively, whether the candidate vehicle safety system components identify algorithm output data (e.g., continuity data, feasibility data, tracking data, safe stops, etc.) sooner and/or more accurately and/or effectively than the representative vehicle safety system components.

Threshold similarities being set to be relatively higher (e.g., requiring relatively closer matches between the representative vehicles and the candidate vehicles) can be utilized to increase accuracies of the safety system component tests. Increasing accuracies of the of the safety system component tests can be utilized to provide more effective results for presenting information usable to identify whether the representative vehicle systems or the test vehicle systems are more effective for controlling vehicles in safer manners.

Threshold similarities being set to be relatively lower (e.g., allowing relatively larger amounts of differences between the representative vehicles and the candidate vehicles) can be utilized to increase available amounts of log data to be utilized for the safety system component tests, even if some of the log data may produce less accurate test results. In some cases, the threshold similarities may be set to be relatively lower to increase amounts of log data (e.g., available log data), if the available log data for testing the candidate vehicle components is too low, sparse, and/or confining.

Alternatively or additionally to utilizing similarities between representative vehicle types and test vehicle types, the log data to be utilized to test the vehicle safety system components can be identified based on similarities between representative vehicle locations and test vehicle locations being equal to or greater than threshold similarities, the representative vehicle locations being associated with the representative vehicles, the test vehicle locations being associated with the candidate vehicles. The log data to be utilized to test the candidate vehicle system components of the candidate vehicles can be identified based on types of event metrics to be generated as a result of vehicle safety system component testing.

Setting the threshold similarities for the representative vehicle locations and the test vehicle locations to be relatively higher to utilize representative vehicle safety system components that more closely match the candidate vehicle safety system components, may be utilized to provide more accurate comparisons between the representative vehicle safety system components and the candidate vehicle safety system components. The more accurate comparisons between the representative vehicle safety system components and the candidate vehicle safety system components may be more accurate based on more accurate determinations of the representative event metrics and the test event metrics being made by testing of the candidate vehicle safety system components.

The aggregated event metrics can be generated by aggregating the representative event metrics and the test event metrics (e.g., by evaluating test event metrics across a plurality of log data). The aggregated event metrics can be utilized to validate the representative vehicle components based on representative results output by the representative vehicle components as representative algorithm output data, and test results output by the candidate vehicle components as test algorithm output data. The representative algorithm output data can include representative vehicle continuity data (or "representative algorithm output continuity data"), representative feasibility data (or "representative algorithm output feasibility data"), and/or representative vehicle tracking data (or "representative algorithm output tracking data) (e.g., relating to divergence of the vehicle from a planned trajectory) associated with output of an algorithm utilized to test the representative vehicle components, the algorithm incorporating any analysis as discussed throughout the current disclosure that is utilized to identify one or more of the event metric(s) based on the log data.

The representative algorithm output data can include data associated with information determined by, and/or utilized to control, the representative vehicles. The representative vehicle continuity data can be indicative of vehicle command data being continuous from first times to second times (e.g., within some threshold of commanded accelerations, steering angles, stopping points, overall motion, etc.). The representative vehicle feasibility data can be indicative of the representative vehicles operating within one or more of kinematic limits or dynamic limits (e.g., within some acceleration limit). The representative vehicle tracking data can be indicative of representative vehicle states diverging from representative planned states associated with representative trajectories.

The test algorithm output data can include candidate vehicle continuity data (or "test algorithm output continuity data), candidate vehicle feasibility data (or "algorithm output feasibility data), and/or candidate vehicle tracking data (or "test algorithm output tracking data) associated with output of an algorithm, as discussed in further detail below, utilized to test the candidate vehicle components. The test algorithm output data can include data associated with information determined by, and/or utilized to control, the candidate vehicles. The candidate vehicle continuity data can be indicative of vehicle command data being continuous from first times to second times. The candidate vehicle feasibility data can be indicative of the vehicles operating within one or more of kinematic limits or dynamic limits. The candidate vehicle tracking data can be indicative of test vehicle states diverging from test planned states associated with test trajectories.

Results output by the vehicle components can be utilized to determine the aggregated event metrics based on differences between representative times associated with initiating representative actions determined by the representative vehicle trajectory components, and test times associated with initiating test actions determined by candidate vehicle trajectory components. As a non-limiting example of which, a reaction time and/or stopping distance may be compared when running the log data through the secondary system as compared to an updated version of the secondary system. Such aggregated metrics, in such a case, may comprise the average difference in stopping distance, reaction time, deceleration, etc. Alternatively or additionally, the results output by the vehicle components can include the aggregated event metrics being determined based on differences being between representative causes of triggering the representative actions and test causes of triggering the test actions.

The vehicle secondary systems can include various subcomponents utilized to manage continuity, feasibility, and adherability (e.g., amounts of tracking errors, as discussed below in further detail) of trajectory based vehicle control relative to current trajectories. The trajectory based vehicle control subcomponents can include continuity subcomponents to manage and/or generate the vehicle movement continuity data. The vehicle movement continuity data can indicate continuity levels (e.g., inverses of malformed trajectory levels, as discussed below in further detail) indicating how closely the current trajectories adhere to previous trajectories. The vehicle movement continuity data can indicate whether tracking trajectories are malformed tracking trajectories associated with malformed tracking trajectory levels (e.g., relative levels representing how much the current trajectories are spatially different from the previous tracking trajectories, based on distances between points of the current trajectories and spatially analogous points of the previous tracking trajectories).

In some examples, the malformed tracking trajectory levels may be relatively higher based on relatively larger numbers of points of the current trajectories being spatially separated from analogous points of the previous tracking trajectories. In those or other examples, the malformed tracking trajectory levels may be relatively higher based on relatively larger distances separating the points of the current trajectories from the analogous points of the previous tracking trajectories. The malformed tracking trajectories may include current tracking trajectories with portions (e.g., points on the current tracking trajectories) that jump (e.g., jump laterally) with respect to pervious trajectories.

The vehicle movement continuity data can be utilized to validate the candidate safety components based on the continuity levels being equal to or greater than threshold continuity levels, and/or based on the malformed tracking trajectory levels being equal to or less than threshold malformed tracking trajectory levels. In some examples, the malformed tracking trajectory levels being equal to or greater than the threshold malformed tracking trajectory levels may be associated with relatively larger changes (e.g., lateral jumps of 0.5 meters (m), 1 m, 3 m, 10 m) in the portions of the tracking trajectories, such as with current tracking trajectories being spatially continuous with respect to analogous portions (e.g., spatially similar portions of the current tracking trajectories, based on the current tracking trajectories being projected onto the previous tracking trajectories) of previous trajectories. Alternatively or additionally, the malformed tracking trajectory levels (e.g., distances between points of the current tracking trajectories and the previous tracking trajectories) being greater than the threshold malformed tracking trajectory levels (e.g., lateral jumps of 0.5 m, 1 m, 3 m, 10 m) may be associated with relatively larger jumps between portions of current tracking trajectories with respect to portions of previous trajectories, such as jumps due to vehicle lane changes.

The trajectory based vehicle control subcomponents can include feasibility subcomponents to manage and/or generate the vehicle movement feasibility data. The vehicle movement feasibility data can indicate maneuverability levels associated with the current trajectories, and maneuverability limits on the vehicles. The maneuverability limits can be determined based on at least one of maximum positive accelerations, maximum negative accelerations, maximum lateral accelerations, maximum steering angles, or maximum steering angle rates. The vehicle movement feasibility data can be utilized to validate the candidate safety components based on the maneuverability levels being equal to or less than the maneuverability limits.

The trajectory-based vehicle control subcomponents can include tracking subcomponents to manage and/or generate the vehicle movement tracking data. The vehicle movement tracking data can indicate the adherability by determining tracking errors of vehicle states relative to the current trajectories. The vehicle movement tracking data can be utilized to validate the candidate safety components based on the tracking errors (e.g., lateral offsets, velocity deviations, etc.) being less than or equal to a threshold tracking errors.

The techniques discussed herein may improve the safety and passenger comfort of vehicles by utilizing optimized and accurate software in vehicle safety components. Periodic and/or continuous testing and/or updating of the vehicle safety system components can be performed to prevent invalid or risky trajectories from being implemented by the vehicle. Preventing the vehicles from being controlled by the invalid or risky trajectories may improve overall vehicle safety, vehicle response time, increase smoothness of changes in vehicle movement, decrease amounts of wear on vehicle systems, and reduce travel times.

In at least some examples, such techniques may further prevent collisions by providing effective safety system redundancy for primary vehicle components. The safety system redundancy may be utilized to mitigate errors in any system or subsystem associated with the trajectory generation components (perception, prediction, planning, etc.). Overall complexity of primary systems or subsystems utilized according to existing technologies can be reduced by implementing the safety system component testing as discussed herein. By reducing system or subsystem complexity, compute resources, memory resources, and/or network resources can be conserved and/or allocated for other purposes. Moreover, the current techniques may reduce amounts of computational bandwidth, memory, and/or power consumed by primary vehicle systems for vehicle control and collision avoidance in comparison to former techniques.

The techniques discussed herein may increase the effectiveness of the safety system components. Overall error rates resulting from trajectory management may be reduced as a result of safety system component testing of generated trajectories. Such techniques may further reduce the required computational resources for ensuring safe operation of a complex system, such as an autonomous vehicle.

The techniques discussed herein may increase the effectiveness of the safety system components. Overall error rates resulting from trajectory management may be reduced as a result of safety system component testing of generated trajectories. Such techniques May further reduce the required computational resources for ensuring safe operation of a complex system, such as an autonomous vehicle.

FIG. 1 is a pictorial flow diagram of an example process 100 for safety component validation and update management.

An operation 102 can include receiving log data based on a driving history of a one or more of a vehicle in a fleet of vehicles, including a simulated fleet. The fleet of vehicles can include one or more vehicle (or "representative vehicle(s)"), such as one or more autonomous vehicles, one or more non-autonomous vehicles, etc., being controllable to traverse an environment. The vehicle(s) can be controlled based on trajectories determined by the vehicle(s) or can otherwise be controlled to traverse the environment. The vehicle(s) can include various systems utilized to control the vehicle(s) to brake, accelerate, turn, etc., based on sensor data received by various sensors (e.g., a lidar sensor, a radar sensor, a camera, etc.) of the vehicle(s). The driving history (or "vehicle fleet driving history") associated with the fleet can include driving histories (or "vehicle driving histories") associated with the fleet vehicle(s). The vehicle fleet driving history can be indicated by driving history data, which can include vehicle historical location data identifying vehicle locations (or "historical vehicle locations") of the environment through which the vehicle(s) traverse. Alternatively or additionally, the driving history data can include historical vehicle type data associated with vehicle types (or "historical vehicle types") of the vehicle(s).

In some examples, the log data may include one or more portions of data (e.g., the sensor data or determinations made based on sensor data) utilized to determine the control data. For examples, one or more messages transmitted based on the sensor data and utilized to control the vehicles, via the control data, may be included in the log data. Although the log data, which may including the message(s), may be included for testing one or more vehicles (e.g., the vehicle(s) 112, as discussed below), as discussed in the current disclosure, it is not limited as such. In some examples, a subset of the log data (e.g., a subset including one or more of the message(s)) may be utilized for testing (e.g., the testing of the vehicle(s) 112).

An example 104 illustrates an environment in which vehicle(s) (e.g., autonomous vehicle(s)) (or "representative vehicle(s)") 106 are and/or were traversing (e.g., moving along a road). The vehicle(s) 106 can include one or more primary systems (e.g., main artificial intelligence (AIs)) and one or more secondary systems. The secondary system(s) can include one or more safety system components (e.g., vehicle trajectory component(s)) (or "representative safety system component(s)") utilized to maintain safety and comfort associated with vehicle maneuvers. The safety system component(s) can be utilized to generate perception data, filter detected objects, perform collision checking, and/or manage trajectories. The vehicle(s) 106 can be controlled based on actions taken by the primary systems and/or the secondary systems safety component(s), the actions including ones or more actions (or "safety system action(s)") taken by the safety system component(s). The safety system component(s) can include one or more perception components, one or more filter components, one or more collision detection components, and/or one or more trajectory management components.

The log data, which can be associated with the representative safety system component(s) of the vehicle(s) 106, can include data associated with the vehicle(s) 106 and/or the representative safety system component(s). The log data can include one or more trajectories traveled by the vehicle(s) 106 including any number of messages or data used by the vehicle (e.g., sensor data, perception data, component message data, trajectory control data, etc.). The log data received based on the driving history can include (or otherwise be indicative of) one or more event metrics (or "representative event metric(s)") representing actions (or "representative actions") (e.g., safe stops, etc.) taken by the representative safety system component(s).

The event metric(s) can be utilized to identify vehicle actions taken by the safety system component(s) of the vehicle(s) 106 based on the log data. The vehicle actions can include one or more representative safe stops of one or more safe stop types performed by the vehicle(s) 106, and/or one or more other representative safe stops or one or more other safe stop types performed by the vehicle(s) 106, the other safe stop type(s) being different from the safe stop type(s). In some examples, the representative safe stop(s) can be performed to stop the vehicle(s) 106 at one or more distances and/or times from one or more locations in which the representative safe stop(s) begin. In those or other examples, the other representative safe stop(s) can be performed to stop the vehicle(s) 106 at one or more other distances from one or more other locations in which the other representative safe stop(s) begin, the other distance(s) at which the vehicle(s) 106 stop as a result of the other representative safe stop(s) being equal to or less than the distance(s) at which the vehicle(s) 106 stop as a result of the representative safe stop(s).

Although the event metric(s) can be utilized to identify the vehicle action(s) including safe stops at the distance(s) and/or the other safe stop(s) at the other distance(s), the other distance(s) being equal to or less than the distance(s) at which the vehicle(s) 106 stop, as discussed above in the current disclosure, it is not limited as such. Any of one or more of the event metric(s) of one or more of various types (e.g., one or more of safe stop metric(s), and/or one or more of continuity metric(s), feasibility metric(s), tracking metric(s), as discussed below in further detail, etc.) associated with one or more causes may be identified for purposes of comparison with one or more of other event metric(s) associated with one or more similar or different causes, and/or may be determined as being safer, more accurate, and/or preferable according to one or more other aspects, in comparison to the one or more of the other event metric(s) (e.g., one or more of safe stop metric(s), continuity metric(s), feasibility metric(s), tracking metric(s), etc.), based on one or more of various characteristics. The characteristic(s) may include, for example, safe stop distances being relatively shorter, safe stop distances being relatively larger (e.g., such as to avoid jolts to passengers, if safety is not compromised, distances from other objects being relatively larger, distances from other objects being relatively smaller (e.g., such as to avoid jolts to passengers, if safety is not compromised), trajectories and/or vehicle actions being relatively more continuous, smooth, etc., and so on. Any comparison between one or more event metric(s) (e.g., event metric(s) associated with the vehicle(s) 106 and/or the vehicle(s) 112, as discussed below) of any types with one or more other event metric(s) (e.g., event metric(s) associated with the vehicle(s) 106 and/or the vehicle(s) 112, as discussed below) of other types may be determined based on any of the characteristics.

The driving history data can be collected as the vehicle(s) 106 traverse the environment. The driving history data can include any information determined, received, and/or managed by any systems associated with the vehicle(s) 106, such as vehicle systems, and/or other systems communicatively coupled to the vehicle(s) 106. In some examples, the vehicle history data can include one or more of various types of data, including sensor data, detected object/event data, path planning data, vehicle state information, environmental data, etc. The sensor data can include lidar data, radar data, camera data, etc.

The detected object/event data can include one or more locations of one or more detected objects, tracks of the detected object(s) (e.g., position(s), velocity(ies), acceleration(s), and/or heading(s) of the object(s)), one or more classifications (e.g., label(s)) of the detected object(s) (e.g., sub-class(es) and subset(s) of object classification(s)), one or more identifiers of detected events, one or more confidence levels (e.g., percentage(s), indicator(s) that classification(s) and/or identifier(s) of detected event(s) are associated with indicator(s) of high unpredictability(ies) or low confidence(s)), one or more rates of change of confidence levels over time, and/or one or more priorities associated with the objects and/or events. The path planning data can include one or more routes, one or more progresses of the vehicle(s) 106 along the route, one or more mission types (e.g., stops for additional passengers, one or more pick ups and deliveries of passengers), passenger input, one or more trajectories, one or more poses of the vehicle(s) 106, one or more geographic locations of the vehicle(s) 106, and/or one or more trajectories determined by the vehicle 106.

The vehicle state information can include vehicle pose data (e.g., x, y, z, yaw, pitch, roll), speed/velocity data (including angular rotation rate), acceleration data (including angular acceleration), one or more numbers of passengers occupying the vehicle(s) 106, passenger input (e.g., speech, passenger states), one or more indications of vehicle and/or sensor health, one or more indications of vehicle histories (e.g., past routes, past requests for assistance, past maintenance), one or more charge levels of batteries of the vehicle(s) 106, one or more distances of the vehicle 106 from fleet bases, one or more indications of whether communication sessions are open between the vehicle 106 and teleoperator devices and/or vehicle(s), vehicle control data, one or more vehicle types, road network data (e.g., data related to global or local maps of areas associated with operation of the vehicle(s) 106 such as, for example, one or more locations of the vehicle(s) 106 within one or more local maps and/or one or more indications of whether vehicle data is normative for the locations (e.g., whether vehicle speeds are above or below speed limits indicated by the road network data, whether the vehicle(s) 106 are stopped at positions that are identified as being stop locations, whether the vehicle(s) 106 are within one or more predefined distances of fleet-wide events)), communication channel information (e.g., one or more bandwidths and/or qualities of connections, one or more identifications of devices to which the vehicle(s) 106 are connected, one or more predicted communication channel degradations), and/or previous teleoperator guidance data including data identifying one or more messages to the vehicle(s) 106 (e.g., direct instruction(s), collaboration(s), and/or confirmation(s)).

The environmental data (e.g., data included in the representations of the sensor data or data acquired via the network interfaces) can include traffic information, weather information, one or more city/regional events (e.g., data acquired from social media, publications, etc. identifying the events), one or more times of day, and/or road network data (e.g., processor-executable map(s) accessible to the vehicle 106 utilized to identify geographical location(s) as being normal driving areas, drivable area(s), speed limit(s) associated with geographical regions, event location(s) (e.g., accident location(s), location(s) from which multiple requests have been sent, etc.), and/or undriveable area(s) and/or operating policy(ies) for vehicle(s) 106 to operate therein)).

The log data can include various types of vehicle system component action or trajectory based data, such as data continuity, feasibility data, and/or adherability data. The continuity data (or "representative continuity data") (or "vehicle movement continuity data") can indicate continuity levels associated with one or more trajectories (or "representative trajectory(ies)") (e.g., current trajectory(ies) generated by the primary systems) adhering to previous trajectories (e.g., trajectories generated by the primary systems at previous times). The vehicle movement continuity data can be utilized to validate one or more safety components (e.g., the candidate safety component(s), as discussed below in further detail) based on the continuity levels being equal to or greater than threshold trajectory deviations.

The continuity data can be indicative of vehicle command data being continuous from different times (e.g., first times to second times). The vehicle command data being continuous from different times can be identified based on identifying whether the representative current trajectory(ies) adhere to (or "match") (or "overlap") previous representative trajectories. The continuity data can be associated with continuity of one or more velocities, one or more accelerations, one or more yaws, one or more poses, etc. of the vehicle(s) 106. One or more current representative trajectories matching one or more previous representative trajectories can be identified spatially, by projecting the current representative trajectory(ies) onto the previous representative trajectory(ies). The continuity level being relatively higher may be associated with the current representative trajectory(ies) matching the previous representative trajectory(ies) relatively more closely.

The feasibility data (or "representative feasibility data") (or "vehicle movement feasibility data") can indicate one or more maneuverability levels associated with the representative trajectories, and/or one or more maneuverability limits on the vehicle(s) 106. The maneuverability limit(s) can be determined based on at least one of one or more maximum positive accelerations, one or more maximum negative accelerations, one or more maximum lateral accelerations, one or more maximum steering angles, one or more maximum steering angle rates, or any other kinematic and/or dynamic constraint of the vehicle (which may be location or environmentally determined). The vehicle movement feasibility data can be utilized to validate the candidate safety component(s) component based on the maneuverability level(s) being equal to or less than the maneuverability limit(s).

The representative feasibility data, which can indicate the maneuverability level(s) and/or the maneuverability limit(s), may be relatively higher based on the representative vehicles operating more closely within one or more of kinematic limits or dynamic limits. The representative feasibility data being relatively higher may be more accurately determined based on similarities between representative vehicle safety system component(s) and candidate vehicle safety system component(s) being greater than or equal to threshold similarities, which may set to be relatively higher. In other words, setting the threshold similarities to be relatively higher to utilize representative vehicle safety system component(s) that more closely match the candidate vehicle safety system component(s), may be utilized to provide the representative event metric(s) and one or more other event metrics (e.g., the test event metric(s), as discussed below in further detail) that enable more accurate comparisons between the representative vehicle safety system component(s) and the candidate vehicle safety system component(s).

The adherability (e.g., tracking data) (or "representative tracking data") (or "vehicle movement tracking data") can indicate one or more tracking errors of vehicle states relative to the representative trajectory(ies). Such tracking errors may comprise a divergence from a current state as compared to a planned state in accordance with a received trajectory. The vehicle movement tracking data can be utilized to validate the candidate safety component(s) based on the tracking error (e.g., one or more lateral offsets, one or more velocity deviations, etc.) being less than or equal to a threshold offset error.

An operation 108 can include analyzing behavior of one or more candidate vehicles (or "test vehicle(s)") to identify output data. The candidate vehicle behavior can be analyzed by inputting the log data into systems, including one or more safety system components (or "candidate safety system component(s)") (or "test safety system component(s)"), of the candidate vehicle(s). The log data input to the candidate safety system component(s) can be selected based on determining the log data (e.g., the log data generated by the representative vehicles 106) includes data associated with historical vehicle types being similar types, and historical vehicle locations being similar locations, as for the candidate vehicle(s). By utilizing the log data associated with the similar vehicle types and the similar historical vehicle locations, accuracy and effectiveness of the output data, and/or vehicle actions (e.g., safe stops, etc.) taken by the safety system component(s) of the candidate vehicle(s) based on the log data, can be improved.

One or more vehicle type data associated with one or more vehicle types (e.g., the historical vehicle types), which can be utilized to identify the log data, can include various characteristics of vehicles. In some examples, the vehicle type data can include a make, a model, a size, a shape, one or more components (e.g., any of one or more portions of the vehicle, such as tires, seats, rims, brakes, etc.) a control system (e.g., hardware, software, etc. of the control system), and/or any of one or more other characteristics and/or information associated with the vehicle.

An example 110 illustrates one or more vehicles (e.g., autonomous vehicle(s)) (e.g., vehicle(s) to be tested) (or "candidate vehicle(s)") 112 including secondary systems (or "candidate safety systems") utilized to input the log data, the secondary systems including one or more safety system components (or "candidate safety system component(s)"). In some examples, any candidate vehicle(s) (e.g., the candidate vehicle(s) 112) can be interpreted as test vehicle systems managed by computing devices (e.g., the computing device(s) 648) for purposes of performing any of the techniques discussed herein.

The candidate safety system component(s), which can input the log data, can be utilized to analyze behavior (e.g., moving forward, changing lanes, stopping, etc.) of the vehicle(s) 112. The analyzed candidate vehicle behavior can be utilized to identify the output data based on processing of the log data. In some examples, the log data can include log data associated with a driving history of a fleet of vehicles, and/or other log data associated with a simulated driving history of a simulated vehicle.

An operation 114 can include analyzing the output data utilizing a test component to identify algorithm output data and one or more event metrics (or "test event metric(s)"). In some examples, the algorithm output data can include data (e.g., the continuity 116, the feasibility 118, the tracking 120, etc., as discussed below) output by an algorithm including analysis to identify the event metric(s) (e.g., the event metric(s), as discussed below). The event metric(s) can include various types of metrics (e.g., the continuity metric(s), the feasibility metric(s), and/or the tracking metric(s), as discussed below in further detail).

In some examples, the candidate safety system component(s) can include the test component, which can input the log data to generate the output data, which can include the event metric(s) representing the algorithm output data associated with the vehicle(s) 112. The test event metric(s) determined by the representative vehicle safety component(s) of the vehicle(s) 112 can include similar types of event metrics as the representative event metrics determined by the representative vehicle safety component(s) of the vehicle(s) 106.

The event metric(s) can be utilized to identify one or more vehicle actions (e.g., safe stop(s), etc.) taken by the safety system component(s) of the vehicle(s) 112 based on the log data. The vehicle action(s) can include one or more test safe stops of one or more safe stop types performed by the vehicle(s) 112, and/or one or more other test safe stops or one or more other safe stop types performed by the vehicle(s) 112, the other safe stop type(s) being different from the safe stop type(s). In some examples, the test safe stop(s) can be determined to stop the vehicle(s) 112 at one or more distances from one or more locations in which the test safe stop(s) begin. In those or other examples, the other test safe stop(s) can be determined to stop the vehicle(s) 112 at one or more other distances from one or more other locations in which the other test safe stop(s) begin, the other distance(s) at which the vehicle(s) 112 are determined to stop as a result of the other test safe stop(s) being equal to or less than the distance(s) at which the vehicle(s) 112 are determined to stop as a result of the test safe stop(s).

The algorithm output data can be associated with continuity 116, feasibility 118, and tracking 120 of the vehicle(s) 112, with respect to one or more current trajectories (or "test current trajectory(ies)"). The current trajectory(ies) can be identified and/or generated by, and/or received from, the primary system(s) (e.g., the main AIs of the vehicle(s) 112). The algorithm output data can include continuity data (or "test continuity data") associated with the continuity 116, which can be similar to the representative continuity data, as discussed above, except with the test continuity data being determined based on the current trajectory(ies) and one or more previous trajectories of the vehicle(s) 112. By way of example, the test continuity data can indicate one or more continuity levels (or "test continuity level(s)") indicating how closely the test current trajectory(ies) adhere to one or more previous trajectories (or "test previous trajectory(ies)").

The event metric(s) can include one or more continuity metrics (e.g., continuity metric(s) in the continuity 116), one or more feasibility metrics (e.g., feasibility metric(s) in the feasibility 118), and/or one or more tracking metrics (e.g., tracking metric(s) in the tracking 120. The continuity metric(s) can include one or more portions of data indicative of vehicle command data being continuous from different times (e.g., first times to second times). In some examples, the continuity metric(s) (e.g., one or more malformed tracking trajectory levels) can identify that one or more distances exist between one or more points of the current tracking trajectory(ies) and one or more points of the previous tracking trajectory(ies), the distance(s) being greater than or equal to one or more threshold distances (e.g., lateral jumps of 0.5 meters (m), 1 m, 3 m, 10 m).

Alternatively or additionally, the test continuity data can indicate whether the test current trajectory(ies) include one or more malformed tracking trajectories (or "test malformed tracking trajectory(ies)") associated with one or more malformed tracking trajectory levels (or "test malformed tracking trajectory level(s)")). In some examples, the test malformed tracking trajectory(ies) can be identified based on one or more tracking changes (or "test tracking change(s)") associated with one or more "jumps" in the test tracking trajectory(ies). In those or other examples, the test malformed tracking trajectory(ies) can be identified based on relatively larger changes in the test tracking trajectory(ies), such as with the tracking trajectory(ies) being at least partially spatially discontinuous with respect to one or more previous trajectories.

In some examples, the malformed tracking trajectory(ies) can include the current tracking trajectory(ies) having one or more distances that exist between one or more points of the current tracking trajectory(ies) and one or more points of the previous tracking trajectory(ies). In those or other examples, the distance(s) may be greater than or equal to one or more threshold distances (e.g., lateral jumps of 0.5 meters (m), 1 m, 3 m, 10 m, etc.).

The test continuity data can be utilized to validate the candidate safety component(s), as valid candidate safety component(s), based on the continuity level(s) being equal to or greater than one or more threshold continuity levels (or "test threshold continuity level(s)"), and/or based on the test tracking change(s) being equal to or less than one or more threshold tracking changes (or "test threshold tracking change(s)"), and/or based on the test malformed tracking trajectory level(s) being equal to or less than one or more test threshold malformed tracking trajectory level(s).

The algorithm output data can include feasibility data (or "test feasibility data") associated with the feasibility 118, which can be similar to the representative feasibility data, as discussed above, except with the test feasibility data being determined based on the current trajectory(ies) of the vehicle(s) 112. By way of example, the test feasibility data can indicate one or more maneuverability levels (or "test maneuverability level(s)") associated with the current trajectory(ies), and one or more maneuverability limits (or "test maneuverability limit(s)") on the vehicle(s) 112. The test feasibility data can be utilized to validate the candidate safety component(s), as valid candidate safety component(s), based on the test maneuverability levels being equal to or less than the test maneuverability limit(s).

The feasibility metric(s) can include one or more portions of data indicative of the vehicle operating within one or more of one or more kinematic limits or one or more dynamic limits. The feasibility metric(s) can include a lateral distance metric associate with a lateral distance, a longitudinal distance metric associated with a longitudinal distance, an initiation metric associated with initiation of a stopping time, and/or a total stopping time metric associate with a total stopping time. The feasibility metric(s) can be utilized to identify that the trajectory(ies) of the vehicle(s) 112 include safe distances, laterally and/or the longitudinally, and/or that the trajectory(ies) of the vehicle(s) 112 include safe initiation of stopping times and/or safe total stopping times. The candidate safety component(s) can determine the feasibility metric(s) identifying the lateral distance, the longitudinal distance, the initiation of the stopping time, and/or the total stopping time to compare the feasibility metric(s) of the candidate safety component(s) with the feasibility metric(s) of the representative safety component(s). The candidate safety component(s) may be determined to be safer and/or more accurate than the representative safety component(s) based on safety of operating the vehicle(s) 112 utilizing the test feasibility metric(s) being greater than or equal to safety based on the representative feasibility metric(s).

In some examples, the feasibility metric(s) can identify that one or more velocities are greater than or equal to one or more threshold velocities, one or more accelerations are greater than or equal to one or more threshold accelerations, etc. The feasibility metric(s) can be utilized to identify whether any of the trajectory(ies) in the log data being analyzed by the candidate safety component(s) are capable of being adhered to by the vehicle(s) 112 with respect to the kinematic limit or dynamic limit of the vehicle(s) 112.

The algorithm output data can include tracking data (or "test tracking data") associated with the tracking 120, which can be similar to the representative tracking data, as discussed above, except with the test tracking data being determined based on the current trajectory(ies) of the vehicle(s) 112. The tracking data can include the tracking metric(s). The tracking metric(s) can include one or more portions of data indicative of a vehicle state diverging from a planned state associated with the trajectory. By way of example, the tracking 120 can indicate one or more tracking errors (or "test tracking errors") (e.g., one or more test lateral offsets, one or more test velocity deviations, etc.) of one or more vehicle states (or "test vehicle states") relative to the test current trajectory(ies) of the vehicle(s) 112. The test tracking data can be utilized to validate the candidate safety component(s), as valid candidate safety component(s), based on the test tracking error(s) being less than or equal to one or more test threshold tracking error(s).

Validation of the candidate safety component(s) can include determining whether the candidate safety component(s) fire (e.g., output data identifying one or more of the event metric(s)) based on testing utilizing the log data. The candidate safety component(s) firing can include output of one or more safe stop metrics (e.g., metric(s) identifying the safe stop(s)), the continuity metric(s), the feasibility metric(s), the tracking metric(s)), based on testing of the candidate safety component(s)

An operation 122 can include aggregating metric data including the event metrics to identify aggregated metric data. The aggregated metric data can be generated based on the representative event metric(s) generated based on the log data processed by the representative safety system component(s) of the vehicle(s) 106, and the test event metrics generated based on the log data processed by the candidate safety system component(s) of the vehicle(s) 112.

In some examples, the representative event metric(s) and the test event metric(s) can be utilized to determine the aggregated metric data based on a comparison between the representative event metric(s) and the test event metric(s). The representative event metric(s) can be compared to the test event metric(s) to identify similarities between the representative event metric(s) can be compared to the test event metric(s).

By way of example, a representative event metric can be identified as being similar to a test event metric based on the representative event metric being a similar type as the test event metric. The similar type may be indicated by both the representative event metric and the test event metric sharing the same metric type. The same metric type being shared between the representative event metric and the test event metric may include a continuity metric type, a feasibility metric type, a tracking metric type, or a safe stop metric type. As such, differences may be determined with respect to how many times and for what reason the secondary system was invoked to modify the trajectory.

The representative event metric and the test event metric may be included in the aggregated metric data based on one or more characteristics associated with the shared event metric type. By way of example, for instance with the shared event metric type being a metric type (e.g., the continuity metric type, the feasibility metric type, the tracking error metric type, the safe stop metric type, etc.), the representative event metric and the test event metric may be included in, and/or utilized to determine, the aggregated metric data based on the representative event metric and/or the test event metric being a metric (e.g., a continuity metric, a feasibility metric, a tracking error metric, a safe stop metric, etc.) of the metric type. In some examples, for instance with the representative event metric and the test event metric being the metric of the metric type, which can be, for example, the continuity metric, the representative event metric and the test event metric can be associated with a respective distance separating a respective point of a respective current trajectory and another respective point of a respective previous trajectory being greater than a threshold distance. In those or other examples, the representative event metric and the test event metric each being the continuity metric may be associated with different respective vehicle action and/or trajectory characteristics, and/or with different respective times at which the respective points are associated. In some examples, the aggregated metric data can be utilized to analyze various causes (or "action reasons") (e.g., one or more discontinuities in one or more trajectories, one or more infeasibilities of the trajectory(ies), one or more tracking errors of the trajectory(ies), etc.) of the representative event metric and/or the test event metric. In those or other examples, the aggregated metric data can be utilized to analyze various causes of the representative event metric and the test event metric being associated with the different respective vehicle action and/or trajectory characteristics and/or with the different times. In those or other examples, the test event metric being can be determined as being associated with an accuracy level that is greater than or equal to that of the representative event metric, based on the causes, the different respective vehicle action and/or trajectory characteristics, and/or the different times.

The test event metric being can be determined as being associated with the greater than or equal to accuracy level based on a time at which the test event metric is determined with respect to a cause of the test event metric and the representative event metric, and another time at which the representative event metric is determined with respect to the cause. The test event metric being can be determined as being associated with the greater than or equal to accuracy level based on the time at which the test event metric is determined being earlier than or equal to the other time at which the representative event metric.

Manual analysis (e.g., operator analysis) via a dashboard (e.g., the planner dashboard 212, as discussed below with reference to FIG. 2) may be utilized to identify why the representative event metric and the test event metric are associated with the different times. The planner dashboard 212 can be utilized to output an environment representation of the vehicle 106 at a time associated with the representative event metric, and to output an environment representation of the vehicle 112 at a time associated with the test event metric. A user (or "operator") can view the representations associated with the representative event metric and the test event metric to determine one or more causes for the difference in time, for example.

One or more confirmations can be received from the user utilizing the planner dashboard 212. The confirmation can be received by a user selection of one or more metrics (e.g., any of the event metric(s)) associated with the updated second component. The user selection can be received via user input received by a user interface presented via a user device. For example, the confirmation may be utilized by the user to identify via the user selection of the test event metric(s) associated with the candidate safety component, that the candidate safety component is safer and/or more accurate than the representative safety component utilized to generate the respective representative event metric(s).

Although the representative event metric and the test event metric each being the continuity metric can be utilized to identify the cause(s) for the differences in time, as discussed above in the current disclosure, it is not limited as such. One or more other differences (e.g., type(s) of event metrics, cause(s) of the event metrics) for other shared types of event metrics (e.g., the feasibility metric type, the tracking metric type, the safe stop metric type, etc.) can be analyzed in a similar way as for the representative event metric and the test event metric each being the continuity metric.

Although, the test event metric being can be determined as being associated with the greater than or equal to accuracy level based on the time at which the test event metric is determined being earlier than or equal to the other time at which the representative event metric, as discussed in the current disclosure, it is not limited as such. In some examples, the test event metric being can be determined as being associated with the greater than or equal to accuracy level based on the time at which the test event metric is determined being greater than or equal to the other time at which the representative event metric, based on the test event metric being determined more accurately and/or precisely than the representative event metric. In some examples, more time may be allowed based on the cause of the event metrics not requiring urgent action by the vehicle. In those or other examples, triggering of the representative safety system component too early may be utilized to determine the test event metric having greater than or equal to accuracy level based on the test vehicle safety system taking advantage of extra time allotted by the cause being non-urgent to more accurately determine the test event metric.

Although the representative event metric and the test event metric each being the continuity metric can be utilized to identify the cause(s) for the differences in time, as discussed above in the current disclosure, it is not limited as such. One or more metrics (or "sub-metric(s)") can be included in any of the event metric(s). By way of example, an event metric can be determined based on one or more metrics (e.g., sub-metric(s)), such as a continuity event metric (e.g., the representative event metric) being determined based on a first continuity metric (e.g., a first yaw metric) and a second continuity metric (e.g., a first velocity metric).

An analysis can be performed by the user to identify whether the event metric is safer and/or more accurate in comparison to another event metric (e.g., the test event metric) determined based on a third continuity metric (e.g., a second yaw metric) and a fourth continuity metric (e.g., a second velocity metric). By way of example, the test event metric can be determined as being safer and/or more accurate due to one or more other event metrics (e.g., the second metric(s)) of various types, such as the second yaw and/or velocity metrics, being determined as being safer for operation of the vehicle than the first event metric(s) (e.g., the first yaw metric and/or the first velocity metric). Any number of event metric(s), which may be implemented collectively in a similar way as being any single event metric of the event metric(s), and which may be utilized for purposes of performing any techniques as discussed herein in a similar way as for any single event metric of the event metric(s), for example, can be determined and utilized to make comparisons between different event metric(s) being initiated at the same or different times and/or having the same or different causes, alternatively or in addition to, the event metric(s) being associated with causes of the event metric(s) being the same, and/or or the initiation times of the event metric(s) (e.g., times at which the event metric(s) are determined by the vehicles) being the same. Any of one or more of the event metric(s) (e.g., a test event metric) can be determined as being safer and/or more accurate than other event metric(s) (e.g., a representative event metric) based on environmental data (e.g., one or more portions of the environmental data, as discussed above), object data (e.g., data associated with objects in the environment), vehicle data (e.g., one or more portions of data associated with the vehicle(s) 106), and/or any other type of data associated, respectively with the test event metric and the representative event metric being. By way of example, the An operation 124 can include identifying summary data based on aggregated metric data. The summary data can include data identifying differences between the representative event metrics and the test event metrics. Identifying the summary data can include validating the candidate safety system component(s) of the vehicle(s) 112, based on the aggregated metric data.

In some examples, the summary data can include descriptions, ratings, and/or analysis results associated with the aggregated metric data. The summary data can include ratings indicating portions of the metric data that are more accurate with respect to other portions of the metric data. By way of example, the summary data include one or more flags with values identifying one or more of the test event metric(s) that are determined as being more accurate than one or more of the representative event metric(s). The summary data include one or more flags with other values identifying the one or more of the representative event metric(s) being less accurate than the one or more of the test event metric(s).

In those or other examples, any less safe and/or less accurate event metric(s) (e.g., a representative event metric) can be omitted from the aggregated metric data. In those or other examples, for instance with one or more of the test event metric(s) being identified as being safer and/or more accurate than one or more of the representative event metric(s), the one or more of the test event metric(s) being identified as being safer and/or more accurate than one or more of the representative event metric(s) can be included in the aggregated metric data. In those or other examples, the one or more of the representative event metric(s) being less safe and/or less accurate than the one or more of the test event metric(s) can be omitted and/or excluded from the aggregated metric data.

An operation 126 can include updating control data based on the summary data. The summary data can include safety levels associated with the safety system component output, including the representative event metrics and/or the test event metrics determined. In some examples, the accuracy levels can be determined manually. Alternatively or additionally, determination of some or all of the safety levels can be partially or entirely automated. The determination of some or all of the safety levels being partially or entirely automated can be performed in a similar way as manual comparisons between the representative event metrics and/or the test event metrics, except by utilizing computing devices to perform comparisons between the representative event metrics and the test event metrics, as discussed herein. The accuracy levels in the summary data can include representative accuracy levels associated with the representative event metric(s), and test accuracy levels associated with the test event metric(s). The control data, which can be included by vehicle systems of the vehicle(s) 106, can be updated by sending the candidate safety system component(s) to the vehicle(s) 106 to control the vehicle(s) 106 to traverse through the environment.

The candidate safety system component(s) can be sent to the vehicle(s) 106, based on the test accuracy levels being equal to or greater than the representative safety levels. The candidate safety system component(s) can be utilized to replace the representative safety system component(s) as one or more new safety system components in the vehicle(s) 106.

The candidate safety system component(s) can be utilized to replace the representative safety system component(s) as one or more new safety system components in the vehicle(s) 106, such as by transmitting a candidate safety system component (e.g., software being executed as the candidate safety system component) to a vehicle 106. The vehicle 106 can store the candidate safety system component in a computing device component (e.g., the planning component 646, as discussed below with reference to FIG. 6). The stored candidate safety system component can replace a representative safety system component previously stored in the planning component 646, based on the candidate safety system component being safer and/or more accurate for operations utilizing the log data in comparison to the representative safety system component.

An operation 128 can include utilizing the control data to control a vehicle. The vehicle, which can be included in the vehicle(s) 106, can be controlled based on the control data. The vehicle(s) 106, including the vehicle, can be controlled based on the new safety system component(s).

Figure 2:
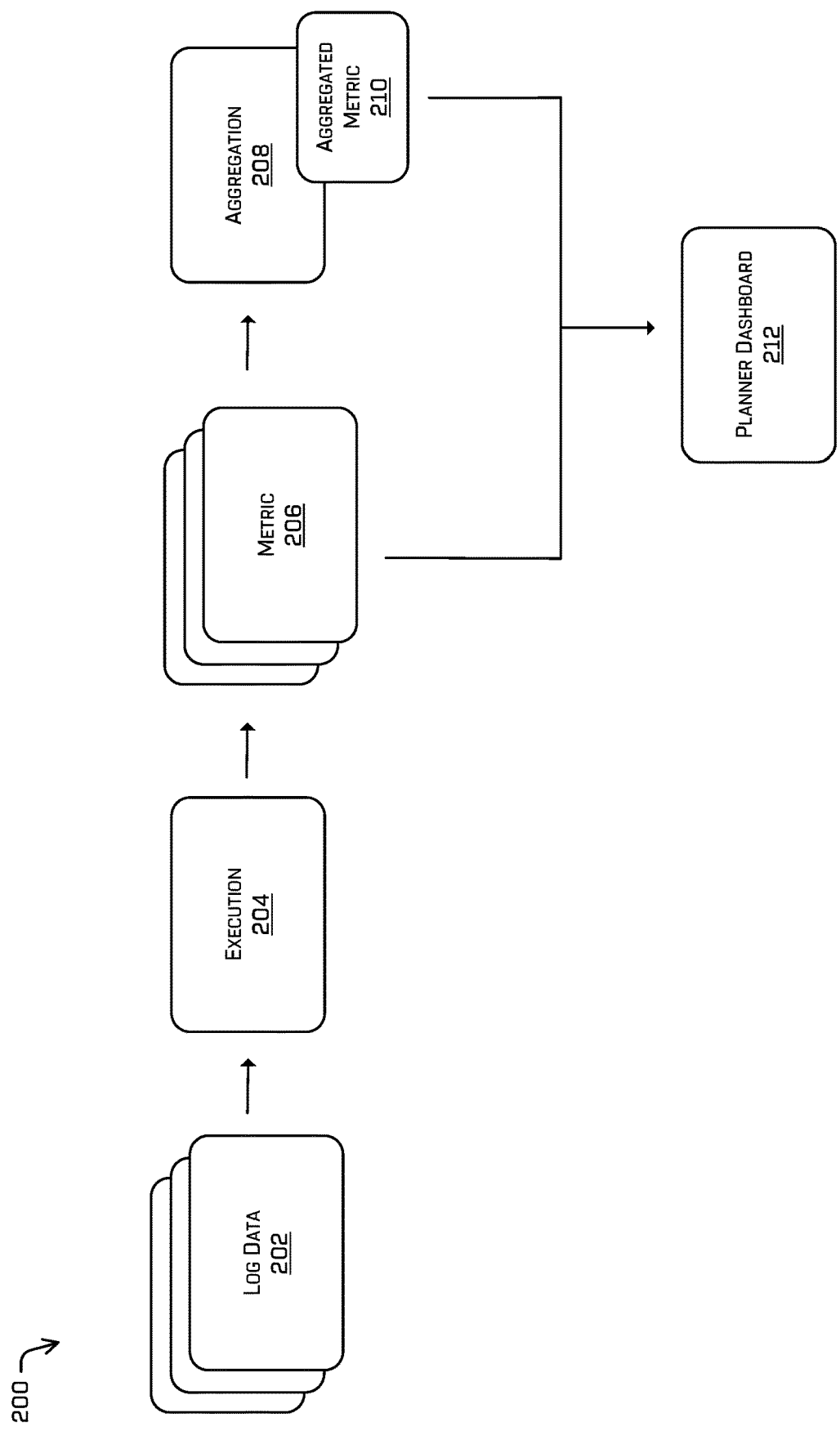
FIG. 2. is a component diagram of example components for safety component validation and update management.

FIG. 2. is a component diagram of example components 200 for safety component validation and update management. The components 200 include one or more log data components (or "log data") 202, an execution component (or "execution") 204, one or more metric components (e.g., test metric component(s)) (or "event metric(s)") (or "test event metric(s)") 206, an aggregation component (or "aggregation") 208, an aggregated metric component (or "aggregated metric(s)") 210, and a planner dashboard component (or planner (dashboard") 212. In some examples, one or more of the components 200, which can be implemented by one or more computing devices (e.g., the computing device(s) 648, as discussed below with reference to FIG. 6), can be utilized to test a safety system component (e.g., candidate safety system component) (or "a test safety system component") in a vehicle (e.g., any of the vehicle(s) 112, as discussed above with reference to FIG. 1).

The log data 202, which can include the log data, as discussed above with reference to FIG. 1, can be processed by the execution 204. The log data 202 can be determined based on log data representing driving histories of fleet vehicles associated with vehicle types and vehicle locations. In some examples, log data generated utilizing a vehicle (e.g., a vehicle 106, as discussed above with reference to FIG. 1) being associated with a similar type and a similar location as the vehicle including the components 200 can be utilized as the log data 202.

The log data 202 can be processed by the execution 204 by executing the candidate safety system component utilizing the log data 202. Executing the candidate safety system component enable testing of candidate safety system component without performing resource intensive simulations of the candidate safety system component (e.g., inputting the log data to a test component to determine whether the test component triggered and the reasons for triggering can be performed in lieu of simulating the complete vehicle behavior driving autonomously). The simulations can be avoided due to the candidate safety system component being downstream of one or more other components (e.g., one or more systems of the of the vehicle 112, such as the primary system(s) discussed above with respect to FIG. 1, in further detail) utilized to generate and/or determine data (e.g., one or more current trajectories, one or more previous trajectories, etc.) input, along with the log data 202, to the execution 204. The upstream component(s) generate and/or determine the data to be input, along with the log data 202, and, possibly feedback data (e.g., data including feedback data output by the candidate safety system component and to one or more other components and/or systems, such as the primary system(s); and/or data output from the other component(s) and/or system(s) based on the feedback data), to the candidate safety system component for processing via the execution 204.

The execution 204 can be utilized to input the log data 202 and output the event metric(s) 206 based on the log data 202. The event metric(s) 206, which can be similar to the event metric(s) as discussed above with reference to FIG. 1, can be utilized to implement the event metric(s) according to any of the techniques discussed throughout this disclosure.

The event metric(s) 206 can be aggregated by the aggregation 208 to generate one or more aggregated metrics, such as the aggregated metric(s) 210. The aggregated metric(s) 210 can include the test event metric(s) 206 generated by the candidate safety system component, and/or one or more representative event metrics generated by a representative safety system component of a representative vehicle (e.g., any of the vehicle(s) 106, as discussed above with reference to FIG. 1).

The aggregated metric(s) 210 can indicate differences between the event metric(s) 206 and the representative event metric(s). In some examples, one or more actions represented by the event metric(s) 206 can be identified, one or more representative actions represented by the representative event metric(s) can be identified, and one or more differences between the action(s) represented by the event metric(s) 206 can be identified in comparison to the representative action(s). The difference(s) can indicate, for example one or more safe stops and/or other safe stops of the action(s) represented by the event metric(s) 206 that did not occur in the representative action(s), and/or one or more representative safe stops and/or other representative safe stops of the representative action(s) that did not occur in the action(s) represented by the event metric(s) 206.

The aggregated metric(s) 210 can include, and/or can incorporate as one or more aggregated metrics, one or more of the representative event metric(s) and/or one or more of the test event metric(s) (e.g., one or more of the test event metric(s) being analogous to the one or more of the representative event metric(s)) based on one or more characteristics associated with a shared event metric type. By way of example, for instance with the shared event metric type being a continuity metric type, a representative event metric and a test event metric may be included in, and/or utilized to determine, an aggregated metric included in aggregated metric data (e.g., which may include the aggregated event metric(s) and/or be utilized, separately from and/or in combination with, the aggregated event metric(s) in a similar way as for the aggregated event metric(s)), based on the representative event metric and the test event metric each being a continuity metric (e.g., the representative event metric and the test event metric each being a continuity metric associated with a distance separating a point of a current trajectory and another point of a previous trajectory being greater than a threshold distance) associated with a same time (e.g., a time separated by a distance being less than or equal to a threshold distance).

The aggregated metric(s) 210 can include the representative event metric and the test event metric, for example, based on respective times associated with the representative event metric and the test event metric being separated by a time period that is less than a threshold time period. The representative event metric and the test event metric each being the continuity metric may be include as the aggregated metric in the aggregated metric(s) 210, based on the respective times being less than or equal to a threshold time. The representative event metric and the test event metric being associated with different, but similar times, may, alternatively or in addition, indicate a same cause resulting in the representative event metric and the test event metric. However, the representative event metric and the test event metric being associated with different, but similar times, may, alternatively or in addition, be associated with one of the representative event metric and the test event metric being more safe or more accurate than the other.

The action(s) represented by the event metric(s) 206, the representative action(s) represented by the representative event metric(s), and/or the aggregated metric(s) 210 associated with the differences between the action(s) represented by the event metric(s) 206 and the representative action(s) can be output to the planner dashboard 212. The planner dashboard 212 can be utilized to analyze the difference to determine a test event metric accuracy level associated with the candidate safety system component, and a representative event metric accuracy level associated with the representative safety system. One or more operations utilized to determine the test event metric accuracy level and/or the representative event metric accuracy level can be performed manually. Alternatively or additionally, one or more operations utilized to determine the test event metric accuracy level and/or the representative event metric accuracy level can be automated by one or more computing devices.

The aggregated metric data can be utilized to analyze, via the planner dashboard 212, various causes of the representative event metric and the test event metric being associated with different initiation times. The test event metric may be determined, via analysis utilizing the planner dashboard 212, as being safer (or preferable in any other way) than the representative event metric, based on the test event metric being identified by the candidate safety system component firing respectively earlier than the candidate safety system component. The candidate safety system component firing may be associated with the candidate safety system component identifying a difference between a point of a current trajectory and another point of a previous trajectory being greater than or equal to a threshold difference. Identifying a lack of continuity by the candidate safety system component respectively earlier than for the representative safety system component may be utilized to identify the candidate safety system component as being safer than the representative safety system component.

The planner dashboard 212 can output results of the determination(s) of the test level of accuracy and/or the representative level of accuracy. The determination result(s) can indicate a candidate safety system component accuracy level based on the test event metric accuracy level, and a representative safety system component accuracy level based on the representative event metric accuracy level. The candidate safety system component can be sent to one or more of the vehicle(s) 106, based on the candidate safety system component accuracy level being equal to or greater than the representative safety system component accuracy level.

Figure 3A:
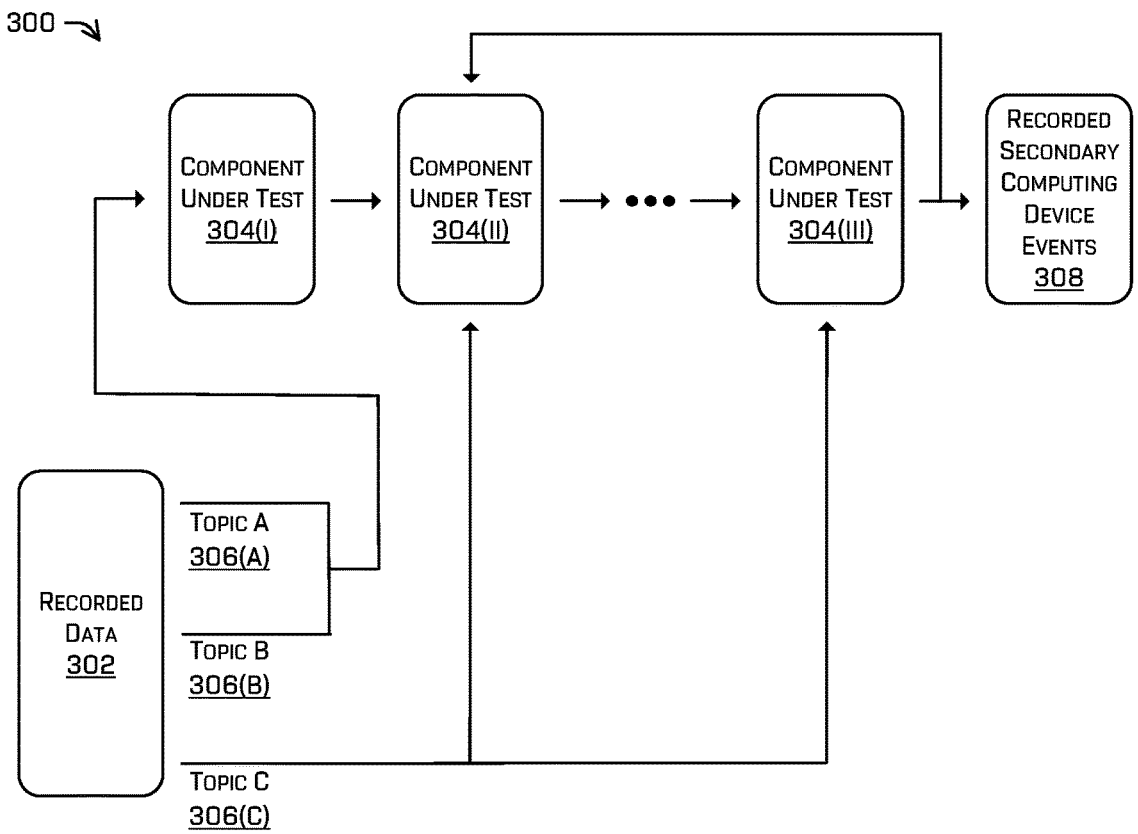
FIGS. 3A and 3B depict component diagrams of example components for safety component validation and update management.
Figure 3B:
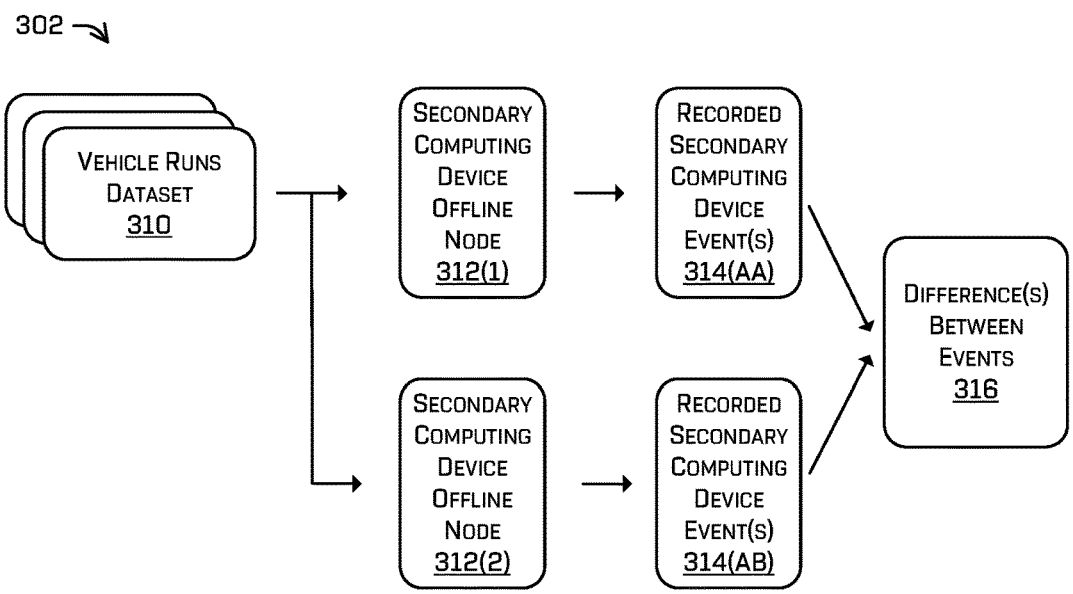

FIGS. 3A and 3B depict component diagrams of example components for safety component validation and update management. As illustrated in FIG. 3A, components 300 can be included in a vehicle (e.g., any of the vehicle(s) 112, as discussed above with reference to FIG. 1). The components 300 can include recorded data components (or "recorded data") 302, which can determine, generate, and/or manage the log data as discussed above with reference to FIG. 1, and/or the log data 202 as discussed above with reference to FIG. 2.

In some examples, the components 300 can include one or more components under test (or "subcomponent(s)") 304(I), 304(II), and 304(III) (collectively "304"), which can be included in a safety system component (e.g., the candidate safety system component being tested via execution 204, as discussed above with reference to FIG. 2). The subcomponent(s) 304 can include a perception subcomponent, a filter subcomponent, a collision checking subcomponent, and/or a trajectory management subcomponent.

The recorded data 302 can include output data 306, which can include portions of output data 306(A), 306(B), and/or 306(C) (collectively "306") associated with a topic A, a topic B, and/or a top C, respectively. The output data can be processed by the subcomponent(s) 304. The output data 306(A) and 306(B), for example, can include data associated with respective objects in the environment of the vehicle 112 including the component(s) 304. The output data 306(C), for example, can include a trajectory.

The components 300 can include recorded secondary computing device event components (or "recorded secondary computing device event(s)") 308 associated with the event metrics 206, as discussed above with reference to FIG. 2. The recorded secondary computing device event(s) can include safe stops of safe stop types performed by the vehicle 112, and/or other safe stops or other safe stop types performed by the vehicle 112, the other safe stop types being different from the safe stop types.

Although the output data 306 can include the output data 306(A), 306(B), and/or 306(C), as discussed above in the current disclosure, it is not limited as such. In some examples, the output data 306 can include any number of output data portions, such as the portions of the output data 306(A), 306(B), and/or 306(C), and/or one or more other portions of output data. Although the subcomponent(s) 304 can include the subcomponent(s) 304(I), 304(II), and/or 304(III), as discussed above in the current disclosure, it is not limited as such. In some examples, the subcomponent(s) 304(I) can include any number of components, such as the subcomponent(s) 304(I), 304(II), and/or 304(III), and/or one or more other components. Although the output data 306(A), 306(B), and/or 306(C) can be received by the subcomponent(s) 304(I), 304(II), and/or 304(III), respectively, as discussed above in the current disclosure, it is not limited as such. In some examples, any portions of the output data 306, and/or one or more other portions of the recorded data 302, can be received by any of the subcomponent(s) 304, and/or any other components and/or subcomponents of the vehicle 112.

As illustrated in FIG. 3B, a vehicle runs dataset 310 can include sets of recorded data (e.g., the recorded data 302, as discussed above with reference to FIG. 3A), which can be utilized to test one or more secondary computing device offline nodes 312(1) and 312(2) (collectively "312"). The secondary computing device offline node(s) 312(1) and 312(2), which can be similar to the safety system component(s) as discussed above with reference to FIGS. 1 and 2, can be utilized to implement the safety system component(s) according to any of the techniques discussed throughout this disclosure. In some examples, individual ones of the secondary computing device offline node(s) 312(1) and 312(2) can include one or more subcomponents (e.g., the subcomponent(s) 304(I), 304(II), and/or 304(III) as discussed above with reference to FIG. 3A, and/or one or more other subcomponents).

In some examples, the log data can be determined based on log data representing driving histories of fleet vehicles associated with vehicle types and vehicle locations. In those or other examples, log data generated utilizing a vehicle (e.g., a vehicle 106, as discussed above with reference to FIG. 1), which can include one or more secondary computing device nodes, being associated with a similar type and a similar location as another vehicle (e.g., a vehicle 112, as discussed above with reference to FIG. 1), which can include one or more of the secondary computing device offline node(s) 312(1) and 312(2)), can be utilized to identify one or more recorded secondary computing device events (e.g., one or more of the recorded secondary computing device event(s) 314(AA) and 314(AB), as discussed below).

In some examples, one or more of the secondary computing device offline node(s) 312(1) and 312(2) can include one or more updated secondary computing device nodes based on one or more of the vehicle safety system component(s), respectively, of the vehicle 106. The secondary computing device offline node(s) 312(1) and 312(2) can be similar to the respective vehicle safety system component(s) of the vehicle 106, but with upgrades and/or modifications. In those or other examples, one or more of the recorded secondary computing device event(s) 314(AA) and 314(AB) can include one or more of the recorded secondary computing device event(s) 308.

The secondary computing device offline node(s) 312 can be utilized to identify one or more event metrics (e.g., the event metric(s) 206, as discussed above with reference to FIG. 2) associated with one or more recorded secondary computing device events 314(AA) and 314 (AB) (collectively "314"). The recorded secondary computing device event(s) 314 can be analyzed to identify one or more differences between one or more test events and one or more representative events.

Any of the recorded secondary computing device event(s) 314 can be analyzed with respect to, and/or in comparison to, one or more representative secondary computing device events (e.g., any of the representative safety system component event(s) as discussed above with reference to FIGS. 1 and 2) determined based on one or more respective representative computing device nodes. One or more differences between events 316 can be identified based on the recorded secondary computing device event(s) 314 and the representative secondary computing device events.

By way of example, one or more recorded secondary computing device events 314 (e.g., the recorded secondary computing device events 314(AA)), which can be associated with one or more test event metrics 206, can be determined based on the secondary computing device offline node 312(1). The recorded secondary computing device event(s) 314(AA) can be analyzed with respect to, or in comparison to, one or more representative secondary computing device events determined based on performance of a representative computing device node. One or more of the difference(s) between events 316 can be identified as difference(s) between one or more of the recorded secondary computing device event(s) 314(AA) and one or more of the representative secondary computing device event(s). One or more similar event sets between the one or more of the recorded secondary computing device event(s) 314(AA) and the one or more of the representative secondary computing device event(s) can be identified.

According to the example discussed above, a recorded secondary computing device event 314(AA) of the recorded secondary computing device event(s) 314(AA), and a representative secondary computing device event of the representative secondary computing device event(s), can be identified as a similar event set of the similar event set(s) can include. The similar event set, which can include the recorded secondary computing device event 314(AA) and the representative secondary computing device event, can be associated with comparison information. The comparison information can include test information associated with the recorded secondary computing device event 314(AA), and representative information associated with the representative secondary computing device event, the test information being similar to the representative information.

The comparison information, which can indicate similarities between the recorded secondary computing device event 314(AA) determined based on the log data analyzed utilizing safety components of the vehicle 106, and the representative secondary computing device event analyzed based on the log data generated utilizing safety components in the vehicle 112, can include one or more types of events (e.g., a first safe stop of a first safe stop type, a second safe stop of a second safe stop type being different from the first safe stop type, etc.), one or more timing of events, one or more characteristics of the events, etc. By way of example, both of the recorded secondary computing device event 314(AA) and the representative secondary computing device event can represent the first safe stop of the first safe stop type, the recorded secondary computing device event 314(AA) can be associated with a first event time, and the representative secondary computing device event can be associated with a second event time being at a time duration from the first event time, the time duration being equal to or less than a threshold time duration.

The comparison information associated with the recorded secondary computing device event 314(AA) and the representative secondary computing device event can be analyzed and utilized to identify a test accuracy level associated with the recorded secondary computing device event 314(AA), and a representative accuracy level associated with the representative secondary computing device event. Thee test accuracy level be identified based on the recorded secondary computing device event 314(AA) being initiated relatively timelier with respect to a cause of the recorded secondary computing device event 314(AA) than for initiation of the representative secondary computing device event. In some examples, the test accuracy level associated with the recorded secondary computing device event 314(AA), which can be associated with the secondary computing device offline node 312(1), can be compared with the representative accuracy level associated with the representative secondary computing device event, which can be associated with the representative computing device offline node, to identify the secondary computing device offline node 312(1) as being more accurate than the representative computing device offline node. The representative accuracy level associated with the representative secondary computing device event may be less than the test accuracy level due to the representative secondary computing device event being initiated relatively more slowly than for the recorded secondary computing device event 314(AA), with respect to a cause of the representative secondary computing device event and the recorded secondary computing device event 314(AA). The timeliness may be determined by operator analysis, such as by utilizing a planner dashboard, as discussed below with respect to FIG. 5. The secondary computing device offline node 312(1) can be sent to a vehicle (e.g., one of the vehicle(s) 106, as discussed above with reference to FIG. 1), to replace a current device node with the secondary computing device offline node 312(1), the secondary computing device offline node 312(1) being utilized to replace the current device node as a new device node. The new device node can be utilized for controlling the vehicle 106 more accurately than with the current device node.

Although the secondary computing device offline node(s) 312 can include the secondary computing device offline node(s) 312(1) and 312(2), and the recorded secondary computing device events 314 can include the recorded secondary computing device events 314(AA) and 314(AB), as discussed above in the current disclosure, it is not limited as such. In some examples, the secondary computing device offline node(s) 312 can include any number of secondary computing device offline nodes. In those or other examples, the recorded secondary computing device event(s) 314 can include any number of recorded secondary computing device events 314, any of which can be associated with one or more of the secondary computing device offline node(s) 312.

Figure 4:
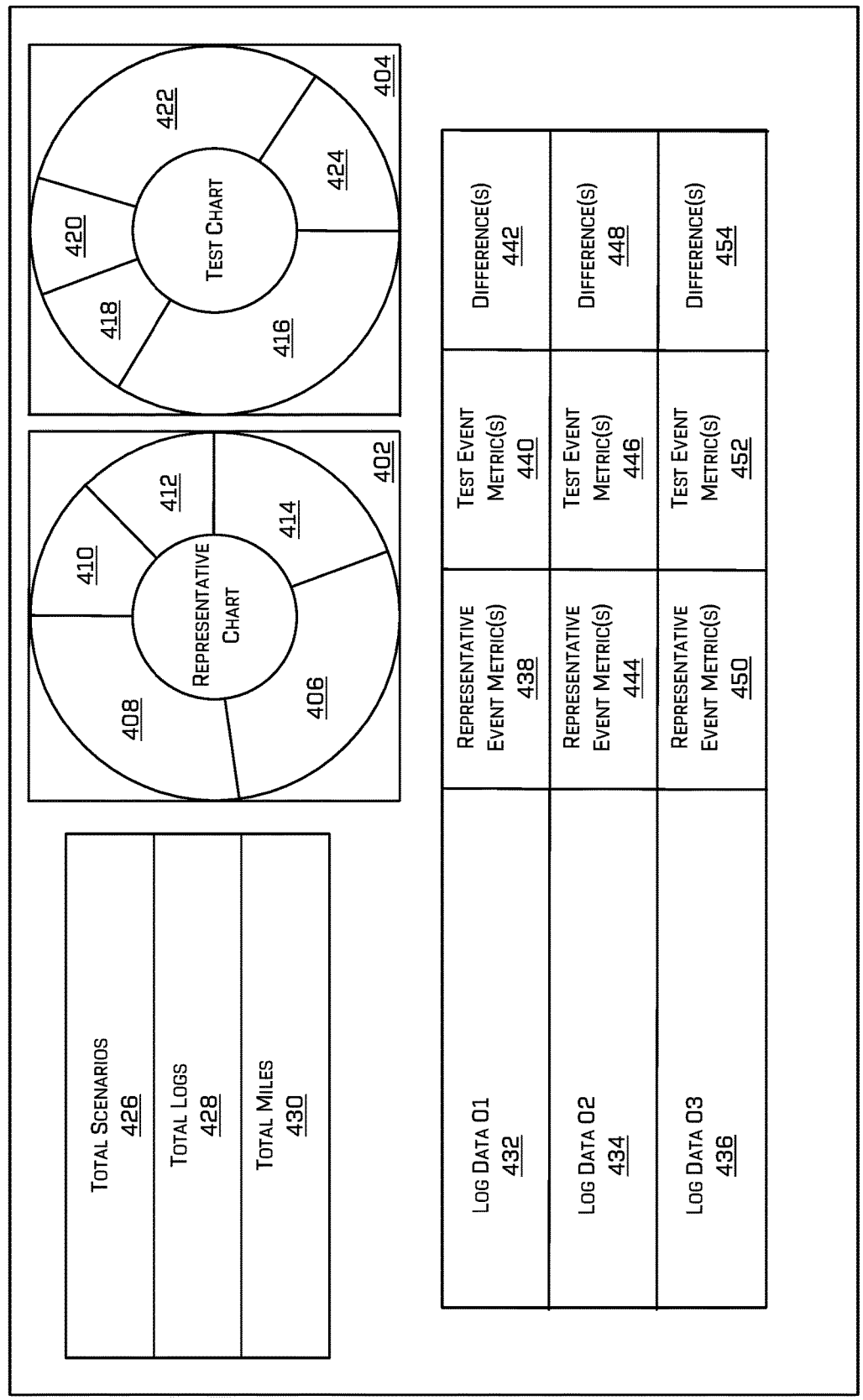
FIG. 4 depicts an example dashboard screen for event metric tracking for safety component validation and update management.

FIG. 4 depicts an example dashboard screen 400 for event metric tracking for safety component validation and update management. The dashboard screen 400 can be utilized by any computing device (e.g., the computing device(s) 648) to analyze the log data and generate one or more event metrics representing test actions taken by a candidate safety system component in response to the log data and representing at least one of algorithm output continuity data, algorithm output feasibility data, or algorithm output tracking data. In some examples, the dashboard screen 400 can be included in the planner dashboard 212, as discussed above with reference to FIG. 2.

The dashboard screen 400 can include a representative chart 402 and a test chart 404. The representative chart 402 can include results of a representative safety system component (e.g., a representative safety system component of the vehicle 106, as discussed above with reference to FIG. 1) processing log data. In some examples, the log data may represent a trajectory travelled by the vehicle 106 and a first action, such as a safe stop, taken by the vehicle 106. The test chart 404 can include results of a candidate safety system component (e.g., the secondary computing device offline node 312(1), which can be included in the candidate vehicle 112, as discussed above with reference to FIGS. 1 and 3) processing the log data.

The representative chart 402 and the test chart 404 can include data portions indicating results output by the representative safety system component of the representative vehicle 106, and the candidate safety system component of the candidate vehicle 112, respectively. The representative chart 402 can include representative in-motion data 406, representative safe stop data 408, representative continuity data 410, representative feasibility data 412, and representative tracking error data 414. The test chart 404 can include test in-motion data 416, test safe stop data 418, test continuity data 420, test feasibility data 422, and test tracking error data 424.

By analyzing information (e.g., the representative in-motion data 406, the representative safe stop data 408, the representative continuity data 410, the representative feasibility data 412, and the representative tracking error data 414) in the representative chart 402, and information (e.g., the test in-motion data 416, the test safe stop data 418, the test continuity data 420, the test feasibility data 422, and the test tracking error data 424) in the test chart 404, analogous types of information can be identified and compared. By way of example, the representative continuity data 410 can include a larger number of representative continuity metrics that the test continuity data 420. Operator analysis can be performed to determine how the log data analyzed by the candidate safety system component of the candidate vehicle 112 and the representative safety system component of the representative vehicle 106 resulted in the larger number of continuity metrics in the representative continuity data 410 than in the test continuity data 420. Similar comparisons can be performed with respect to one or more types of data in the representative chart 402 and the test chart 404.

In some examples, the representative continuity data 410 can include a representative continuity metric that occurs at a similar, but different time, than a test continuity metric in the test continuity data 420. Operator analysis can be performed to determine how the log data analyzed by the candidate safety system component of the candidate vehicle 112 and the representative safety system component of the representative vehicle 106 resulted in the representative continuity metric occurring at a similar, but different time, than the test continuity metric in the test continuity data 420. Identification of the representative continuity metric and the test continuity metric can be based on various factors that are similar between results (e.g., event metrics) based on analysis of a trajectory by the candidate safety system component and the representative safety system component. Similar comparisons can be performed with respect to one or more types of data in the representative chart 402 and the test chart 404.

The data portions of the representative chart 402 and the test chart 404 can be utilized to view different types of results of processing performed by the results safety system component of the of the representative vehicle 106 and the candidate safety system component of the candidate vehicle 112. The in-motion data (e.g., the representative in-motion data 406 and the test in-motion data 416) can include one or more values representing the vehicle(s) (e.g., the vehicle 106 and the vehicle 112) being controlled to be in motion to follow a trajectory. The safe stop data (e.g., the representative safe stop data 408 and the test safe stop data 418) can include one or more values representing the vehicle(s) (e.g., the vehicle 106 and the vehicle 112) being controlled to perform one or more safe stops.

The feasibility data (e.g., the representative feasibility data 412 and the test feasibility data 422) can include one or more values representing one or more trajectories of the vehicle(s) (e.g., the vehicle 106 and the vehicle 112) being determined to lack feasibility. The tracking error data (e.g., the representative tracking error data 414 and the test tracking error data 424) can include one or more values representing one or more trajectories of the vehicle(s) (e.g., the vehicle 106 and the vehicle 112) being determined to include one or more tracking errors.

The dashboard screen 400 can include total scenarios data (or "total scenarios") 426 including a number of one or more scenarios in which the vehicle(s) are driving. In some examples, the total scenarios 426 can include a number of scenarios in which the vehicle 106 is driving, which may be utilized to generate the log data.

The dashboard screen 400 can include total logs data (or "total logs") 428 including a number of one or more logs generated by the vehicle(s). In some examples, the total logs 428 can include a number of logs generated by the vehicle(s) 106, which may be processed by the vehicle(s) 112 to test the candidate safety system component(s) of the vehicle(s) 112.

The dashboard screen 400 can include total miles data (e.g., total autonomous miles data) (or "total miles") 420 including a number of one or more miles driven by the vehicle(s). In some examples, the total miles 430 can include a number of miles driven the vehicle(s) 106 in the scenarios indicated by the total scenarios 426, the miles driven being utilized to generate the logs indicated by the total logs 428.

The dashboard screen 400 can include log data 01 (or "log data 432"), log data 02 (or "log data 434"), and log data 03 (or "log data 436"). The log data (e.g., the log data 432, 434, and/or 436) can include various types of information. In some examples, the information in the for the log data 432 can include one or more representative event metrics 438, one or more test event metrics 440, and one or more differences 442. In some examples, the information in the for the log data 434 can include one or more representative event metrics 444, one or more test event metrics 446, and one or more differences 448. In some examples, the information in the for the log data 436 can include one or more representative event metrics 450, one or more test event metrics 452, and one or more differences 454.

The representative event metric(s) (e.g., the representative event metric(s) 438, 444, and/or 450) can include event metric(s) in the log data (e.g., the log data 432, 434, and/or 436, respectively) generated by the vehicle(s) 106. The test event metric(s) (e.g., the test event metric(s) 440, 446, and/or 452 can include event metric(s) generated based on the log data (e.g., the log data 432, 434, and/or 436) being processed by the candidate safety system component(s) of the vehicle(s) 112.

Although the log data 432, 434, and 436 can be included in the dashboard screen 400, as discussed above in the current disclosure, it is not limited as such. Any number of log data can be included in the dashboard screen 400 in a similar way as for the log data 432, 434, and 436. Any of the log data can include any number and/or type of metrics. Any number and/or type of log data, and/or any number and/or type of data therefor, can be predetermined, and/or can be selectively customized in real time, via operator input while the data is included in the dashboard screen 400.

Figure 5:
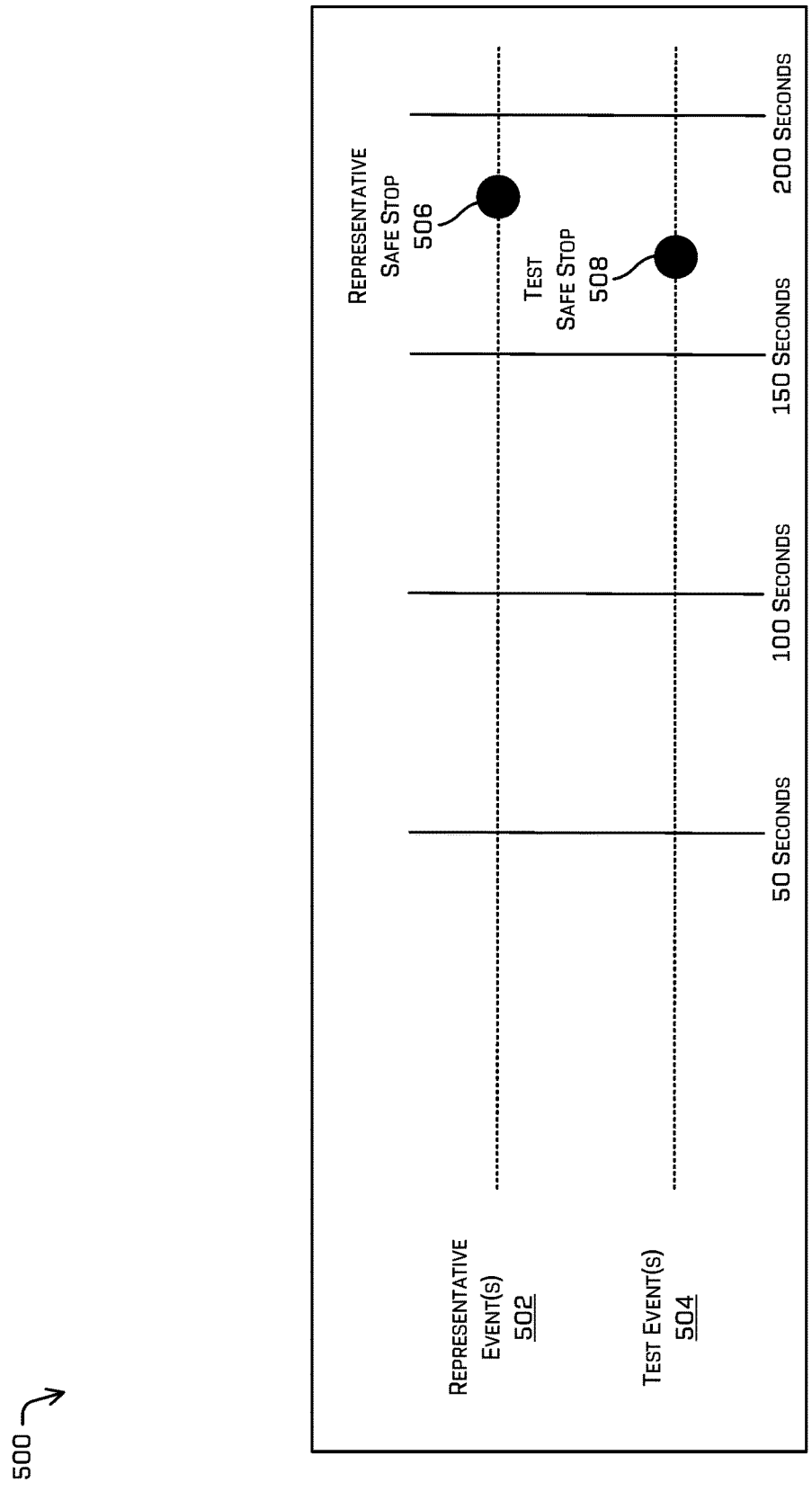
FIG. 5 depicts an example dashboard screen for event identification for safety component validation and update management.

FIG. 5 depicts an example dashboard screen 500 for event identification for safety component validation and update management. The dashboard screen 500 can include an event chart, which can include information associated with one or more representative events 502 and/or one or more test events 504. The representative event(s) 502 can include events (or "actions") taken by representative safety system components of a vehicle (e.g., one of the representative vehicle(s) 106, as discussed above with reference to FIG. 1). The test event(s) 504 can include events (or "actions") taken by candidate safety system components of a vehicle (e.g., one of the candidate vehicle(s) 112, as discussed above with reference to FIG. 1). In some examples, the dashboard screen 500 can be, alternatively or in addition to the dashboard screen 400, included in the planner dashboard 212, as discussed above with reference to FIG. 2.

By way of example, the dashboard screen 500 can include a representative safe stop 506 in the representative event(s), and test safe stop 508 in the test event(s) 504. The representative safe stop 506 and the test safe stop 508 can be compared using the dashboard screen. The representative safe stop 506 can be, for example, a result output by a safety system component of a vehicle (e.g., the vehicle 106, as discussed above with respect to FIG. 1) based on analysis of the log data by a safety system component of the vehicle 106.

The accuracy levels of the representative safety system component of the vehicle 106 and the candidate safety system component of the vehicle 112 can be utilized to determine whether to update one or more vehicle(s) with the candidate safety system component. The vehicle(s) (e.g., any of the vehicle(s) 106) can be updated with the candidate safety system component, based on determining the candidate safety system component has a higher accuracy level than the representative system component.

Figure 6:
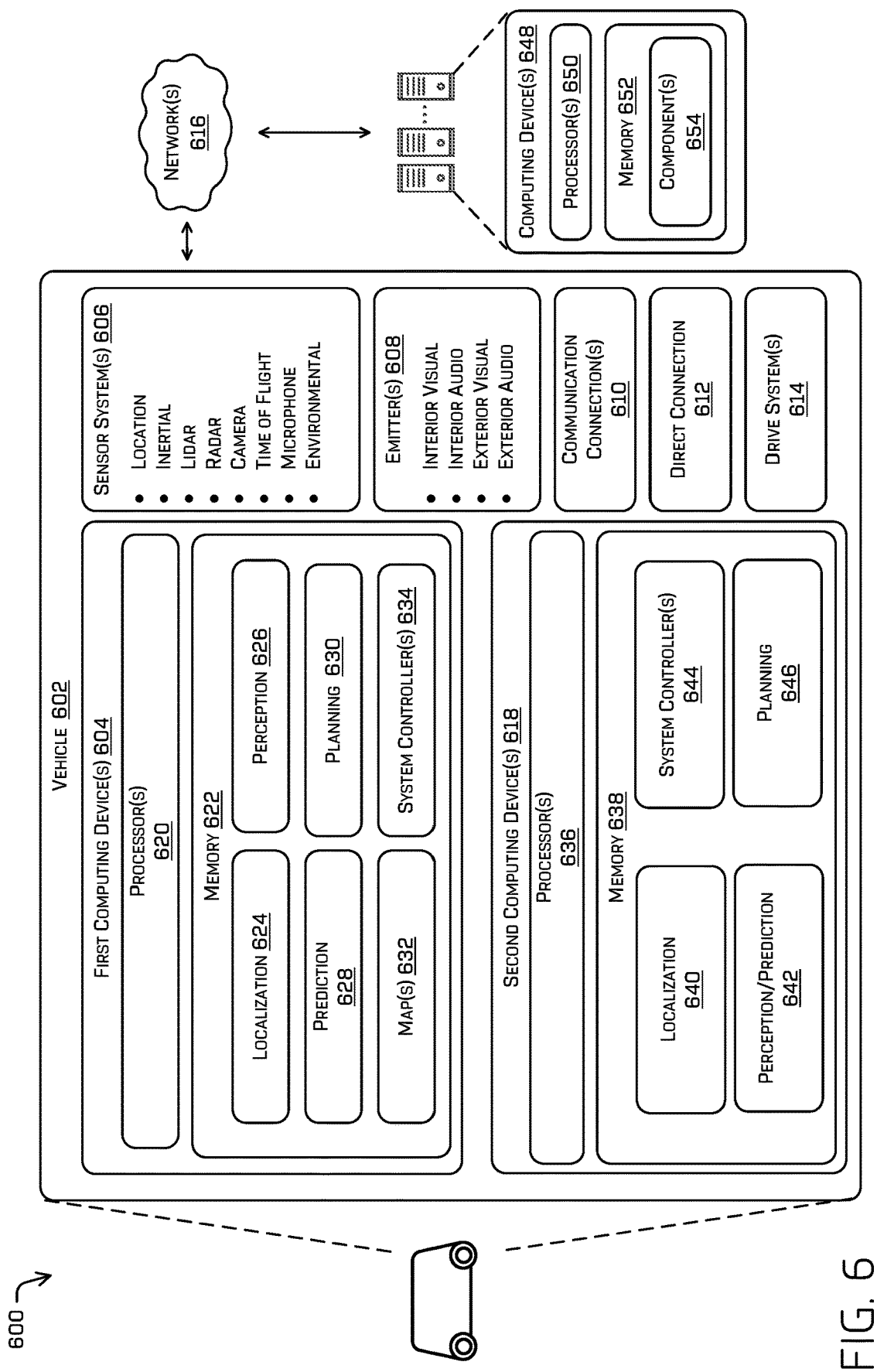
FIG. 6 is a block diagram of an example system for implementing the techniques described herein.

FIG. 6 is a block diagram of an example system for implementing the techniques described herein. In at least one example, the system 600 can include a vehicle 602. In the illustrated example system 600, the vehicle 602 can be an autonomous vehicle; however, the vehicle 602 can be any other type of vehicle.

The vehicle 602 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 602 can be configured to control all functions from start to completion of the trip, including all parking functions, it may not include a driver and/or controls for driving the vehicle 602, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 602 can include one or more first computing devices 604, one or more sensor systems 606, one or more emitters 608, one or more communication connections 610 (also referred to as communication devices and/or modems), at least one direct connection 612 (e.g., for physically coupling with the vehicle 602 to exchange data and/or to provide power), and one or more drive systems 614. By way of example, the first computing device(s) 604 may be considered to be a primary system. In some examples, the first computing device(s) 604 may be utilized to implement the primary system, as discussed above with reference to FIG. 1. The one or more sensor systems 606 can be configured to capture sensor data associated with an environment.

The sensor system(s) 606 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 606 can include multiple instances of each of these or other types of sensors. For instance, the time-of-flight sensors can include individual time-of-flight sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the first computing device(s) 604.

The vehicle 602 can also include emitter(s) 608 for emitting light and/or sound. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 602 can also include communication connection(s) 610 that enable communication between the vehicle 602 and one or more other local or remote computing device(s) (e.g., a remote teleoperation computing device) or remote services. For instance, the communication connection(s) 610 can facilitate communication with other local computing device(s) on the vehicle 602 and/or the drive system(s) 614. Also, the communication connection(s) 610 can allow the vehicle 602 to communicate with other nearby computing device(s) (e.g., other nearby vehicles, traffic signals, etc.).

The communications connection(s) 610 can include physical and/or logical interfaces for connecting the first computing device(s) 604 to another computing device or one or more external networks 616 (e.g., the Internet). For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 602 can include drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include the sensor system(s) 606 to detect conditions of the drive system(s) 614 and/or the surroundings of the vehicle 602. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) 606 on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) 606 and to control operation of the various vehicle systems. In some examples, the drive system controller can include one or more processor(s) and memory communicatively coupled with the one or more processor(s). The memory can store one or more components to perform various functionalities of the drive system(s) 614. Furthermore, the drive system(s) 614 also include one or more communication connection(s) that enable communication by the respective drive system with one or more other local or remote computing device(s).

The vehicle 602 can include one or more second computing devices 618 to provide redundancy, error checking, and/or validation of determinations and/or commands determined by the first computing device(s) 604. By way of example, while the first computing device(s) 604 may be considered to be the primary system, the second computing device(s) 618 may be considered to be a secondary system. In some examples, the second computing device(s) 618 may be utilized to implement the representative safety system(s) and/or the representative safety system component(s) of the vehicle(s) 106, as discussed above with reference to FIG. 1.

The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, predict an object track, generate a trajectory for the vehicle, and so on. In examples, the primary system processes data from multiple types of sensors on the vehicle, such as light detection and ranging (lidar) sensors, radar sensors, image sensors, depth sensors (time of flight, structured light, etc.), and the like.

The secondary system may validate an operation of the primary system and may take over control of the vehicle from the primary system when there is a problem with the primary system (and/or when there is a problem with a trajectory output by the primary system). In examples, the secondary system processes data from a few sensors, such as a subset of sensor data that is processed by the primary system. To illustrate, the primary system may process lidar data, radar data, image data, depth data, etc., while the secondary system may process just lidar data and/or radar data (and/or time of flight data). In other examples, however, the secondary system may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference and for all purposes.

The first computing device(s) 604 can include one or more processors 620 and memory 622 communicatively coupled with the one or more processors 620. In the illustrated example, the memory 622 of the first computing device(s) 604 stores a localization component 624, a perception component 626, a prediction component 628, a planning component 630, a maps component 632, and one or more system controllers 634. Though depicted as residing in the memory 622 for illustrative purposes, it is contemplated that the localization component 624, the perception component 626, the prediction component 628, the planning component 630, the maps component 632, and the one or more system controllers 634 can additionally, or alternatively, be accessible to the first computing device(s) 604 (e.g., stored in a different component of vehicle 602 and/or be accessible to the vehicle 602 (e.g., stored remotely).

In memory 622 of the first computing device 604, the localization component 624 can include functionality to receive data from the sensor system(s) 606 to determine a position of the vehicle 602. For example, the localization component 624 can include and/or request/receive a three-dimensional map of an environment and can continuously determine a location of the autonomous vehicle within the map. In some instances, the localization component 624 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 624 can provide data to various components of the vehicle 602 to determine an initial position of an autonomous vehicle for generating a trajectory, as discussed herein.

The perception component 626 can include functionality to perform object detection, segmentation, and/or classification. In some examples, the perception component 626 can provide processed sensor data that indicates a presence of an entity that is proximate to the vehicle 602 and/or a classification of the entity as an entity type (e.g., car, pedestrian, cyclist, building, tree, road surface, curb, sidewalk, unknown, etc.). In additional or alternative examples, the perception component 626 can provide processed sensor data that indicates one or more characteristics associated with a detected entity and/or the environment in which the entity is positioned. In some examples, characteristics associated with an entity can include, but are not limited to, an x-position (global position), ay-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 626 can use perception algorithms to determine a perception-based bounding box associated with an object in the environment based on sensor data. For example, the perception component 626 can receive image data and classify the image data to determine that an object is represented in the image data. Then, using detection algorithms, the perception component 626 can generate a two-dimensional bounding box and/or a perception-based three-dimensional bounding box associated with the object. The perception component 626 can further generate a three-dimensional bounding box associated with the object. As discussed above, the three-dimensional bounding box can provide additional information such as a location, orientation, pose, and/or size (e.g., length, width, height, etc.) associated with the object.

The perception component 626 can include functionality to store perception data generated by the perception component 626. In some instances, the perception component 626 can determine a track corresponding to an object that has been classified as an object type. For purposes of illustration only, the perception component 626, using sensor system(s) 606 can capture one or more images of an environment. The sensor system(s) 606 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle 602. Fused perception data can include a fusion or other combination of sensor data from sensor system(s) 606, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 628 can generate one or more probability maps representing prediction probabilities of possible locations of one or more objects in an environment. For example, the prediction component 628 can generate one or more probability maps for vehicles, pedestrians, animals, and the like within a threshold distance from the vehicle 602. In some instances, the prediction component 628 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 630 can determine a path for the vehicle 602 to follow to traverse through an environment. For example, the planning component 630 can determine various routes and paths and various levels of detail. In some instances, the planning component 630 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 630 can generate an instruction for guiding the autonomous vehicle along at least a portion of the route from the first location to the second location. In at least one example, the planning component 630 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 630 can alternatively, or additionally, use data from the perception component 626 and/or the prediction component 628 to determine a path for the vehicle 602 to follow to traverse through an environment. For example, the planning component 630 can receive data from the perception component 626 and/or the prediction component 628 regarding objects associated with an environment. Using this data, the planning component 630 can determine a route to travel from a first location (e.g., a current location) to a second location (e.g., a target location) to avoid objects in an environment. In at least some examples, such a planning component 630 may determine there is no such collision free path and, in turn, provide a path which brings vehicle 602 to a safe stop avoiding all collisions and/or otherwise mitigating damage.

The memory 622 can further include one or more maps 632 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 632 can include at least one map (e.g., images and/or a mesh). In some examples, the vehicle 602 can be controlled based at least in part on the map(s) 632. That is, the map(s) 632 can be used in connection with the localization component 624, the perception component 626, the prediction component 628, and/or the planning component 630 to determine a location of the vehicle 602, identify objects in an environment, generate prediction probabilit(ies) associated with objects and/or the vehicle 602, and/or generate routes and/or trajectories to navigate within an environment.

In some examples, the one or more maps 632 can be stored on a remote computing device(s) (such as the computing device(s) 648) accessible via network(s) 616. In some examples, multiple maps 632 can be stored based on, for example, a characteristic (e.g., type of entity, time of day, day of week, season of the year, etc.). Storing multiple maps 632 can have similar memory requirements but can increase the speed at which data in a map can be accessed.

In at least one example, the first computing device(s) 604 can include one or more system controller(s) 634, which can be configured to control steering, propulsion, braking, safety, emitters, communication, and other systems of the vehicle 602. These system controller(s) 634 can communicate with and/or control corresponding systems of the drive system(s) 614 and/or other components of the vehicle 602, which may be configured to operate in accordance with a path provided from the planning component 630.

The second computing device(s) 618 can comprise one or more processors 636 and memory 638 including components to verify and/or control aspects of the vehicle 602, as discussed herein. In at least one instance, the one or more processors 636 can be similar to the processor(s) 620 and the memory 638 can be similar to the memory 622. However, in some examples, the processor(s) 636 and the memory 638 may comprise different hardware than the processor(s) 620 and the memory 622 for additional redundancy.

In some examples, the memory 638 can comprise a localization component 640, a perception/prediction component 642, one or more system controllers 644, and a planning component 646. In some examples, the perception/prediction component 642 can be utilized to implement any features of the perception component 110, as discussed above with reference to FIG. 1.

In some examples, the localization component 640 may receive sensor data from the sensor(s) 606 to determine one or more of a position and/or orientation (together a pose) of the autonomous vehicle 602. Here, the position and/or orientation may be relative to point(s) and/or object(s) in an environment in which the autonomous vehicle 602 is located. In examples, the orientation may include an indication of a yaw, roll, and/or pitch of the autonomous vehicle 602 relative to a reference plane and/or relative to point(s) and/or object(s). In examples, the localization component 640 may perform less processing than the localization component 624 of the first computing device(s) 604 (e.g., higher-level localization). For instance, the localization component 640 may not determine a pose of the autonomous vehicle 602 relative to a map, but merely determine a pose of the autonomous vehicle 602 relative to objects and/or surfaces that are detected around the autonomous vehicle 602 (e.g., a local position and not a global position). Such a position and/or orientation may be determined, for example, using probabilistic filtering techniques, such as, for example, Bayesian filters (Kalman filters, extended Kalman filters, unscented Kalman filters, etc.) using some or all of the sensor data.

In some examples, the perception/prediction component 642 can include functionality to detect, identify, classify, and/or track object(s) represented in sensor data. For example, the perception/prediction component 642 can perform the clustering operations and operations to estimate or determine a height associated with objects, as discussed herein.

In some examples, the perception/prediction component 642 may comprise an M-estimator, but may lack an object classifier such as, for example, a neural network, decision tree, and/or the like for classifying objects. In additional or alternate examples, the perception/prediction component 642 may comprise an ML model of any type, configured to disambiguate classifications of objects. By contrast, the perception component 626 may comprise a pipeline of hardware and/or software components, which may comprise one or more machine-learning models, Bayesian filters (e.g., Kalman filters), graphics processing unit(s) (GPU(s)), and/or the like. In some examples, the perception data determined by the perception/prediction component 642 (and/or 626) may comprise object detections (e.g., identifications of sensor data associated with objects in an environment surrounding the autonomous vehicle), object classifications (e.g., identifications of an object type associated with detected objects), object tracks (e.g., historical, current, and/or predicted object position, velocity, acceleration, and/or heading), and/or the like.

The perception/prediction component 642 may also process the input data to determine one or more predicted trajectories for an object. For example, based on a current position of an object and a velocity of the object over a period of a few seconds, the perception/prediction component 642 may predict a path that the object will move over the next few seconds. In some examples, such a predicted path may comprise using linear assumptions of motion given a position, orientation, velocity, and/or orientation. In other examples, such predicted paths may comprise more complex analyses.

In some examples, the planning component 646 can include functionality to receive a trajectory from the planning component 630 to validate that the trajectory is free of collisions and/or is within safety margins. In some examples, the planning component 646 can generate a safe stop trajectory (e.g., a trajectory to stop the vehicle 602 with a "comfortable" deacceleration (e.g., less than maximum deceleration)) and in some examples the planning component 646 can generate an emergency stop trajectory (e.g., maximum deceleration with or without steering inputs).

In some examples, one or more safety system components, which can include one or more representative safety system components (e.g., a representative safety system component), as discussed above with reference to FIGS. 1-5, can be stored and/or managed by the planning component 646. One or more of the candidate safety system component(s) (e.g., a candidate safety system component), as discussed above with reference to FIGS. 1-5, can be received from the computing device(s) 648, based on the received candidate safety system component(s) being determined as being relatively more accurate than the representative safety system component(s) currently being utilized by the planning component 646. The received candidate safety system component(s) can be utilized to replace and/or upgrade the representative safety system component(s).

In some examples, the system controller(s) 644 can include functionality to control safety critical components (e.g., steering, braking, motors, etc.) of the vehicle. In this manner, the second computing device(s) 618 can provide redundancy and/or an additional hardware and software layer for vehicle safety.

The vehicle 602 can connect to one or more computing devices 648 via the network 616 and can include one or more processors 650 and memory 652 communicatively coupled with the one or more processors 650. In at least one instance, the one or more processors 650 can be similar to the processor(s) 620 and the memory 652 can be similar to the memory 622. In the illustrated example, the memory 652 of the computing device(s) 648 stores a component(s) 654, which may correspond to any of the components discussed herein.

In some examples, the candidate safety system component(s), as discussed above with reference to FIGS. 1-5, can be stored and/or managed by the computing device(s) 648. By way of example, one or more candidate safety systems, and/or one or more of the candidate safety system component(s) (e.g., a candidate safety system component) in the candidate safety system(s), stored in the via computing device(s) 648 (e.g., the memory 652) can be utilized to process log data. The log data may have been previously processed by one or more representative safety systems and/or one or more representative safety system components of the vehicle 602, and/or one or more other vehicles, to generate one or more representative event metrics. The candidate safety system(s) and/or the candidate safety system component(s) can be utilized to process the log data to generate one or more test event metrics. The test event metric(s), which can represent one or more vehicle actions, can be compared to the representative event metric(s). Performing a comparison between the test event metric(s) and the representative event metric(s) can be utilized to determine differences between the test event metric(s) and the representative event metric(s).

The test event metric(s) can be sent by the computing device(s) 648 and to a vehicle (e.g., the vehicle 602), based on the candidate safety system component being determined to be relatively more accurate as a result of processing of the test event metric(s) in contract to processing of the representative event metric(s). The candidate safety system(s) and/or the candidate safety system component(s) can be determined to be relatively more accurate than the representative safety system(s) and/or the representative safety system component(s), based on one or more test accuracy levels associated with the test event metric(s) and one or more representative accuracy levels associated with the representative event metric(s), the test accuracy level(s) being equal to or greater than the representative accuracy level(s). The vehicle 602 can be controlled based on the candidate safety system(s) and/or the candidate safety system component(s) being stored in the planning component 646, as one or more new safety system components and/or one or more new safety system components, to replace one or more current safety systems (e.g., the representative safety system(s)) and/or one or more current safety system components (e.g., the representative safety system component(s)).

Although the candidate safety system component(s) can be stored and/or managed by the computing device(s) 648, as discussed above in the current disclosure, it is not limited as such. In some examples, the computing device(s) 648, the second computing device(s) 618, one or more other on-vehicle computing devices, one or more other off-vehicle computing devices, or a combination of one or more of the computing device(s) 648, the second computing device(s) 618, the other on-vehicle computing device(s), or the other off-vehicle computing device(s) can be utilized to store and/or manage the candidate safety system component(s) and/or to perform any operations according to any of the techniques as discussed throughout this disclosure.

The processor(s) 620, 636, and/or 650 can be any suitable processor capable of executing instructions to process data and perform operations as described herein. By way of example and not limitation, the processor(s) 620, 636, and/or 650 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 622, 638, and/or 652 are examples of non-transitory computer-readable media. The memory 622, 638, and/or 652 can store an operating system and one or more software applications, instructions, programs, and/or data to implement the methods described herein and the functions attributed to the various systems. In various implementations, the memory 622, 638, and/or 652 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 622, 638, and/or 652 can be implemented as a neural network. In some examples, the components in the memory 622, 638, and/or 652 may not include machine learning algorithm to reduce complexity and to be verified and/or certified from a safety standpoint.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 7:
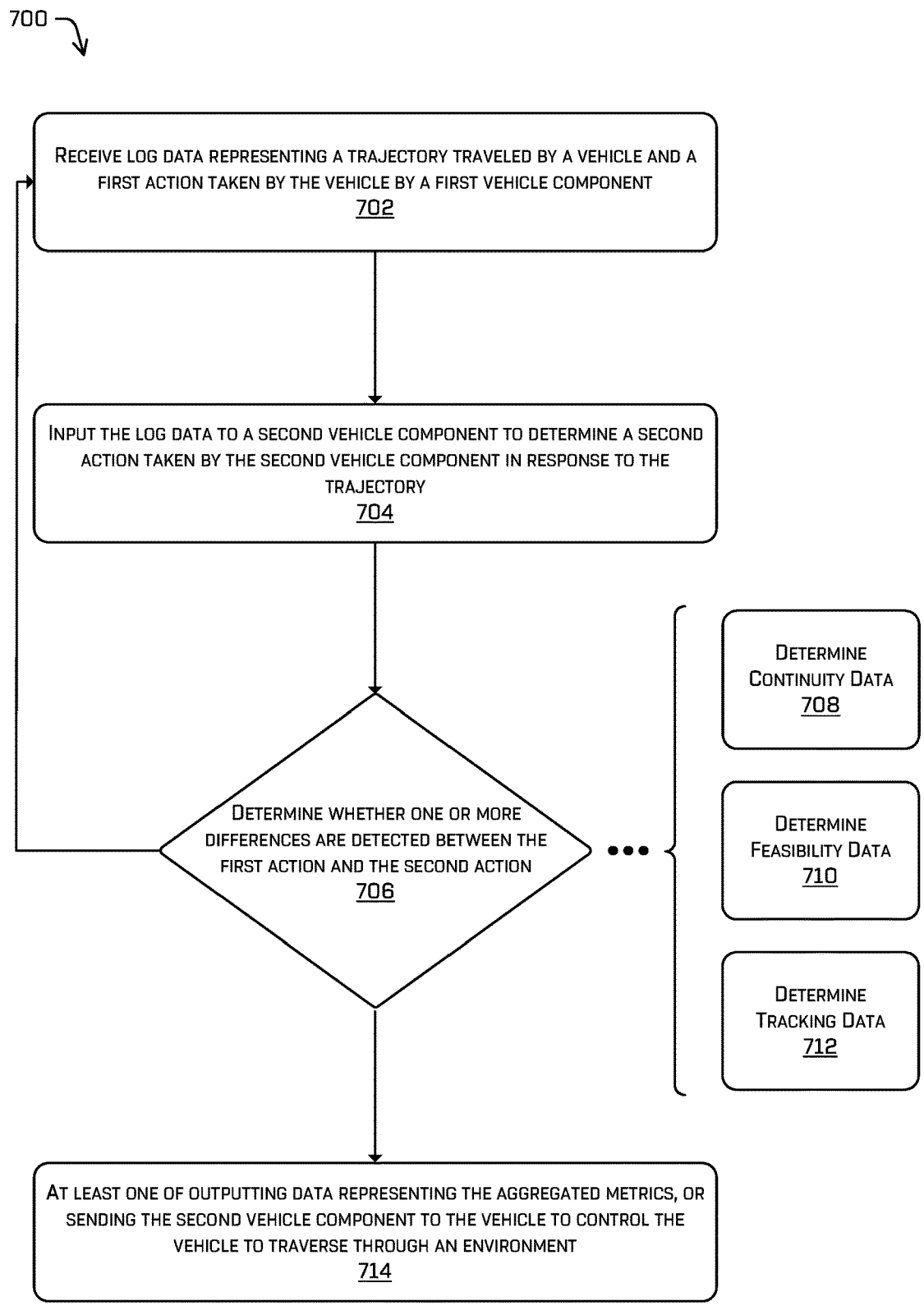
FIG. 7 depicts an example process for safety component validation and update management.

FIG. 7 depicts an example process for safety component validation and update management. In some examples, example process 700 can be executed by at least one or more computing devices (e.g., the computing device(s) 648, as discussed above with reference to FIG. 6).

At operation 702, example process 700 can include receiving log data representing a trajectory traveled by a vehicle and a first action taken by the vehicle (e.g., the vehicle 106, as discussed above with reference to FIG. 1) by a first vehicle component. The log data (e.g., the log data 202, as discussed above with reference to FIG. 2) can be generated based on sensor data captured by the vehicle 106. The first action can include a representative safe stop utilized to stop the vehicle 106 at a distance from a location in which the representative safe stop begins at a representative safe stop start time. The representative safe stop may be associated with a representative safe stop cause. In those or other examples, the distance from the location at which the representative safe stop begins may be equal to or less than another distance at which the vehicle 106 would have stopped as a result of another representative safe stop of another type.

At operation 704, example process 700 can include inputting the log data to a second vehicle component (e.g., the secondary computing device offline node 312(1), as discussed above with reference to FIG. 3B) to determine a second action taken by the second vehicle component in response to the trajectory. The second vehicle component can be associated with a second vehicle (e.g., the candidate vehicle 112, as discussed above with reference to FIG. 1). The second action can include a test safe stop determined to stop the vehicle 112 at a distance from a location in which the test safe stop begins at a test safe stop start time. The test safe stop may be associated with a test safe stop cause. In those or other examples, the distance from the location at which the test safe stop begins may be equal to or less than another distance at which the vehicle 112 would have stopped as a result of another test safe stop of the other type. In some examples, the test safe stop may have a same safe type as the representative safe stop, but a different safe stop start time. In those or other examples, the test safe stop may have a same safe cause as the representative safe stop.

At operation 706, example process 700 can include determining whether one or more differences are detected between the first action and the second action. The difference(s) can represent at least one of a time associated with initiating the second action or a cause of triggering the second action. The difference(s) can be include one or more differences associated with one or more of various types of data (e.g., the continuity data, the feasibility data, and/or the tracking data, as discussed below in further detail).

At operation 708, process 700 can include determining continuity data. The continuity data can include one or more continuity metrics. The continuity metric(s) can be determined based one or more portions of data indicative of vehicle command data being continuous from first times to second times.

At operation 710, process 700 can include determining feasibility data. The feasibility data can include one or more feasibility metrics. The feasibility metric(s) can be determined based one or more portions of data indicative of the vehicle operating within one or more of one or more kinematic limits or one or more dynamic limits.

At operation 712, process 700 can include determining tracking data. The tracking data can include one or more tracking metrics. The tracking metric(s) can include one or more portions of data indicative of a vehicle state diverging from a planned state associated with the trajectory.

The example process 700 can proceed to operation 714 based on determining the difference(s) are detected. The example process 700 can proceed to operation 702 based on determining the difference(s) are not detected.

At operation 708, example process 700 can include at least one of outputting data representing the aggregated metrics, or sending the second vehicle component to the vehicle to control the vehicle to traverse through an environment. The second vehicle (e.g., the vehicle 106, any other vehicle of the vehicle(s) 106, or any other vehicle) can be controlled by utilizing the second vehicle component (e.g., the candidate safety system component), by updating the second vehicle to replace a current safety system component (e.g., the first vehicle component) of the second vehicle with the candidate safety system component. The candidate safety system component can be utilized to replace the current safety system component, based on an accuracy level of the candidate safety system component being equal to or greater than another accuracy level of the current safety system component.

Example Clauses

A: A system comprising: one or more processors; and one or more computer-readable media storing instructions executable by the one or more processors, wherein the instructions, when executed, cause the system to perform operations comprising: receiving log data based at least in part on driving history of a fleet of autonomous vehicles associated with a vehicle type and a location, the log data comprising a first vehicle trajectory generated by a first component and a first vehicle action associated with a first action reason comprising one or more of a first discontinuity in the first vehicle trajectory, a first infeasibility of the first vehicle trajectory, or a first tracking error of the first vehicle trajectory; inputting the log data to an updated second component; receiving, from the updated second component and based at least in part on the first vehicle trajectory, a second vehicle action associated with a second action reason comprising one or more of a second discontinuity in the first vehicle trajectory, a second infeasibility of the first vehicle trajectory, or a second tracking error of the first vehicle trajectory; determining, based at least in part on a difference between the first action reason and the second action reason, a metric; determining, based at least in part on the metric and an additional metric associated with the fleet of autonomous vehicles, an aggregate metric; determining the aggregate metric is less than or equal to a threshold metric; and sending the updated second component to an autonomous vehicle to control the autonomous vehicle to traverse through an environment based at least in part on the aggregate being less than or equal to the threshold metric.

B: The system of paragraph A, wherein determining the metric is further based at least in part on one or more of: a lateral distance, a longitudinal distance, an initiation of a stopping time, or a total stopping time.

C: The system of paragraph A or B, wherein: the first discontinuity is indicative of vehicle command data being discontinuous from a first time to a second time, the infeasibility is indicative of the autonomous vehicle operating at or outside of one or more of a kinematic limit or dynamic limit, and the tracking error is indicative of a vehicle state diverging from a planned state associated with the first vehicle trajectory.

D: The system of any of paragraphs A-C, the operations further comprising: outputting a first graphic including first data representing the additional metric associated with the fleet of autonomous vehicles; outputting a second graphic including second data representing the metric associated with the updated second component; and receiving, as a confirmation of the updated second component, a user input of the metric associated with the updated second component, the user input being received via a user interface presented on a user device, wherein sending the update second component further comprises: sending the updated second component based at least in part on the confirmation.

E: The system of any of paragraphs A-D, wherein at least one of the first vehicle action or the second vehicle action includes a vehicle movement associated with a first safe stop trajectory or a second safe stop trajectory being different from the first safe stop trajectory.

F: One or more non-transitory computer-readable media storing instructions executable by one or more processors, wherein the instructions, when executed, cause the one or more processors to perform operations comprising: receiving log data comprising a trajectory associated with a vehicle and a first action taken by the vehicle in response to the trajectory being processed by a second vehicle component; inputting the log data to an updated second vehicle component to determine a second action taken by the updated second vehicle component in response to the trajectory; determining a difference between a first cause associated with the first action and a second cause associated with the second action, wherein the difference is based at least in part on at least one of a discontinuity of the trajectory, an infeasibility of the trajectory, or a tracking error associated with the trajectory; and at least one of: outputting data representing a metric determined based at least in part on the difference; or sending the updated second vehicle component to the vehicle to control the vehicle to traverse through an environment.

G: The one or more non-transitory computer-readable media of paragraph F, wherein determining the difference comprises one or more of: determining a difference between a first action initiation time and a second action initiation time, determining a difference between a first action triggering cause and a second action triggering cause, or determining a difference between a first stopping distance associated with the first action and a second stopping distance associated with the second action.

H: The one or more non-transitory computer-readable media of paragraph F or G, wherein the metric is further based at least in part on one or more of: a lateral distance, a longitudinal distance, an initiation of a stopping time, or a total stopping time.

I: The one or more non-transitory computer-readable media of any of paragraphs F-H, wherein: the discontinuity is indicative of vehicle command data being discontinuous from a first time to a second time, the infeasibility is indicative of the vehicle operating at or outside of one or more of a kinematic limit or dynamic limit, and the tracking error is indicative of a vehicle state diverging from a planned state associated with the trajectory.

J: The one or more non-transitory computer-readable media of any of paragraphs F-I, the operations further comprising: receiving, as a confirmation of the updated second vehicle component, a user input being received via user input received by a user interface presented via a user device, wherein the at least one of outputting the data or sending the updated second vehicle component further comprises: sending the updated second vehicle component based at least in part on the confirmation.

K: The one or more non-transitory computer-readable media of any of paragraphs F-J, the operations further comprising: determining, based at least in part on the metric and an additional metric associated with a fleet of vehicles, an aggregate metric, the fleet of vehicles comprising the vehicle and another vehicle.

L: The one or more non-transitory computer-readable media of any of paragraphs F-K, wherein: the second vehicle component is utilized to determine a first accuracy level associated with the second vehicle component and the updated second vehicle component is utilized to determine a second accuracy level associated with the updated second vehicle component; the first action is associated with a first time difference between the first action and a cause of the first action and the second action; the second action is associated with a second time difference between the second action and the cause of the first action and the second action, and the second accuracy level is determined as being greater than or equal to the first accuracy level based on the second time difference being less than or equal to the first time difference.

M: The one or more non-transitory computer-readable media of any of paragraphs F-L, wherein: the second vehicle component is utilized to determine a first accuracy level associated with the second vehicle component based at least in part on a first initiation time; the updated second vehicle component is utilized to determine a second accuracy level associated with the updated second vehicle component based at least in part on a second initiation time; and the second accuracy level is determined as being greater than or equal to the first accuracy level based on the second initiation time being sooner than or equal to the first initiation time.

N: The one or more non-transitory computer-readable media of any of paragraphs F-M, wherein the difference represents at least one of a time associated with initiating the second action or a cause of triggering the second action.

O: A method comprising: receiving log data comprising a trajectory associated with a vehicle and a first action taken by the vehicle in response to the trajectory being processed by a second vehicle component; inputting the log data to an updated second vehicle component to determine a second action taken by the updated second vehicle component in response to the trajectory; determining a difference between a first cause associated with the first action and a second cause associated with the second action, wherein the difference is based at least in part on at least one of a discontinuity of the trajectory, an infeasibility of the trajectory, or a tracking error associated with the trajectory; and at least one of: outputting data representing a metric determined based at least in part on the difference; or sending the updated second vehicle component to the vehicle to control the vehicle to traverse through an environment.

P: The method of paragraph O, wherein determining the difference comprises one or more of: determining a difference between a first action initiation time and a second action initiation time, determining a difference between a first action triggering cause and a second action triggering cause, or determining a difference between a first stopping distance associated with the first action and a second stopping distance associated with the second action.

Q: The method of paragraph O or P, wherein the metric is further based at least in part on one or more of: a lateral distance, a longitudinal distance, an initiation of a stopping time, or a total stopping time.

R: The method of any of paragraphs O-Q, wherein: the discontinuity is indicative of vehicle command data being discontinuous from a first time to a second time, the infeasibility is indicative of the vehicle operating at or outside of one or more of a kinematic limit or dynamic limit, and the tracking error is indicative of a vehicle state diverging from a planned state associated with the trajectory.

S: The method of any of paragraphs O-R, further comprising: receiving, as a confirmation of the updated second vehicle component, a user input being received via user input received by a user interface presented via a user device, wherein the at least one of outputting the data or sending the updated second vehicle component further comprises: sending the updated second vehicle component based at least in part on the confirmation.

T: The method of any of paragraphs O-S, further comprising: determining, based at least in part on the metric and an additional metric associated with a fleet of vehicles, an aggregate metric, the fleet of vehicles comprising the vehicle and another vehicle.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the system to perform operations comprising:
receiving log data based at least in part on driving history of a fleet of autonomous vehicles associated with a vehicle type and a location, the log data comprising a first vehicle trajectory generated by a first component and a first vehicle action modifying the first vehicle trajectory, the first vehicle action associated with a first action reason comprising one or more of a first discontinuity in the first vehicle trajectory, a first infeasibility of the first vehicle trajectory, or a first tracking error of the first vehicle trajectory;
inputting the log data to an updated second component;
receiving, from the updated second component and based at least in part on the first vehicle trajectory, a second vehicle action modifying the first vehicle trajectory, the second vehicle action associated with a second action reason comprising one or more of a second discontinuity in the first vehicle trajectory, a second infeasibility of the first vehicle trajectory, or a second tracking error of the first vehicle trajectory;
determining, based at least in part on a difference between the first action reason and the second action reason, a metric;
determining, based at least in part on the metric and an additional metric associated with the fleet of autonomous vehicles, an aggregate metric;
determining that the aggregate metric is less than or equal to a threshold metric; and
sending the updated second component to an autonomous vehicle to control the autonomous vehicle to traverse through an environment based at least in part on the aggregate metric being less than or equal to the threshold metric.

2. The system of claim 1, wherein determining the metric is further based at least in part on one or more of:
a lateral distance,
a longitudinal distance,
an initiation of a stopping time, or
a total stopping time.

3. The system of claim 1, wherein:
the first discontinuity in the first vehicle trajectory is indicative of vehicle command data being discontinuous from a first time to a second time,
the first infeasibility of the first vehicle trajectory is indicative of a vehicle operating at or outside of one or more of a kinematic limit or dynamic limit, and
the first tracking error of the first vehicle trajectory is indicative of a vehicle state diverging from a planned state associated with the first vehicle trajectory.

4. The system of claim 1, the operations further comprising:
outputting a first graphic including first data representing the additional metric associated with the fleet of autonomous vehicles;

outputting a second graphic including second data representing the metric associated with the updated second component; and receiving, as a confirmation of the updated second component, a user input of the metric associated with the updated second component, the user input being received via a user interface presented on a user device, wherein sending the updated second component further comprises:

sending the updated second component based at least in part on the confirmation.

5. The system of claim 1, wherein at least one of the first vehicle action or the second vehicle action includes a vehicle movement associated with a first safe stop trajectory or a second safe stop trajectory being different from the first safe stop trajectory.

6. One or more non-transitory computer-readable media storing instructions executable by one or more processors, wherein the instructions, when executed, cause the one or more processors to perform operations comprising:

receiving log data comprising a trajectory associated with a vehicle and a first action to modify the trajectory taken by the vehicle in response to the trajectory being processed by a second vehicle component;

inputting the log data to an updated second vehicle component to determine a second action to modify the trajectory taken by the updated second vehicle component;

determining a difference between a first cause associated with the first action to modify the trajectory and a second cause associated with the second action to modify the trajectory, wherein the difference is based at least in part on at least one of a discontinuity of the trajectory, an infeasibility of the trajectory, or a tracking error associated with the trajectory; and sending the updated second vehicle component to an additional vehicle, the additional vehicle configured to be controlled to traverse through an environment based at least in part on the updated second vehicle component.

7. The one or more non-transitory computer-readable media of claim 6, wherein determining the difference comprises one or more of:

determining a difference between a first action initiation time and a second action initiation time, determining a difference between a first action triggering cause and a second action triggering cause, or determining a difference between a first stopping distance associated with the first action to modify the trajectory and a second stopping distance associated with the second action to modify the trajectory.

8. The one or more non-transitory computer-readable media of claim 6, the operations further comprising determining, based at least in part on the difference, a metric, wherein the metric is further based at least in part on one or more of:

a lateral distance, a longitudinal distance, an initiation of a stopping time, or a total stopping time.

9. The one or more non-transitory computer-readable media of claim 6, wherein:

the discontinuity of the trajectory is indicative of vehicle command data being discontinuous from a first time to a second time, the infeasibility of the trajectory is indicative of the vehicle operating at or outside of one or more of a kinematic limit or dynamic limit, and the tracking error associated with the trajectory is indicative of a vehicle state diverging from a planned state associated with the trajectory.

10. The one or more non-transitory computer-readable media of claim 6, the operations further comprising:

receiving, as a confirmation of the updated second vehicle component, a user input being received via a user interface presented via a user device, wherein sending the updated second vehicle component further comprises:

sending the updated second vehicle component based at least in part on the confirmation.

11. The one or more non-transitory computer-readable media of claim 6, the operations further comprising:

determining, based at least in part on a metric and an additional metric associated with a fleet of vehicles, an aggregate metric, the fleet of vehicles comprising the vehicle and another vehicle.

12. The one or more non-transitory computer-readable media of claim 6, wherein:

the second vehicle component is utilized to determine a first accuracy level associated with the second vehicle component and the updated second vehicle component is utilized to determine a second accuracy level associated with the updated second vehicle component;

the first action to modify the trajectory is associated with a first time difference between the first action to modify the trajectory and a cause of the first action to modify the trajectory and the second action to modify the trajectory;

the second action to modify the trajectory is associated with a second time difference between the second action to modify the trajectory and the cause of the first action to modify the trajectory and the second action to modify the trajectory, and the second accuracy level is determined as being greater than or equal to the first accuracy level based on the second time difference being less than or equal to the first time difference.

13. The one or more non-transitory computer-readable media of claim 6, wherein:

the second vehicle component is utilized to determine a first accuracy level associated with the second vehicle component based at least in part on a first initiation time;

the updated second vehicle component is utilized to determine a second accuracy level associated with the updated second vehicle component based at least in part on a second initiation time; and the second accuracy level is determined as being greater than or equal to the first accuracy level based on the second initiation time being sooner than or equal to the first initiation time.

14. The one or more non-transitory computer-readable media of claim 6, wherein the difference represents at least one of a time associated with initiating the second action to modify the trajectory or a cause of triggering the second action to modify the trajectory.

15. A method comprising:

receiving log data comprising a trajectory associated with a vehicle and a first action to modify the trajectory, the first action to modify the trajectory taken by the vehicle in response to the trajectory being processed by a second vehicle component;

inputting the log data to an updated second vehicle component to determine a second action to modify the trajectory taken by the updated second vehicle component;

determining a difference between a first cause associated with the first action to modify the trajectory and a second cause associated with the second action to modify the trajectory, wherein the difference is based at least in part on at least one of a discontinuity of the trajectory, an infeasibility of the trajectory, or a tracking error associated with the trajectory; and sending the updated second vehicle component to an additional vehicle, the additional vehicle configured to be controlled to traverse through an environment based at least in part on the updated second vehicle component.

16. The method of claim 15, wherein determining the difference comprises one or more of:

determining a difference between a first action initiation time and a second action initiation time, determining a difference between a first action triggering cause and a second action triggering cause, or determining a difference between a first stopping distance associated with the first action to modify the trajectory and a second stopping distance associated with the second action to modify the trajectory.

17. The method of claim 15, further comprising determining, based at least in part on the difference, a metric, wherein the metric is further based at least in part on one or more of:

a lateral distance, a longitudinal distance, an initiation of a stopping time, or a total stopping time.

18. The method of claim 17, further comprising:

determining, based at least in part on the metric and an additional metric associated with a fleet of vehicles, an aggregate metric, the fleet of vehicles comprising the vehicle and another vehicle.

19. The method of claim 15, wherein:

the discontinuity of the trajectory is indicative of vehicle command data being discontinuous from a first time to a second time, the infeasibility of the trajectory is indicative of the vehicle operating at or outside of one or more of a kinematic limit or dynamic limit, and the tracking error associated with the trajectory is indicative of a vehicle state diverging from a planned state associated with the trajectory.

20. The method of claim 15, further comprising:

receiving, as a confirmation of the updated second vehicle component, a user input being received via a user interface presented via a user device, wherein sending the updated second vehicle component further comprises:

sending the updated second vehicle component based at least in part on the confirmation.

\* \* \* \* \*